United States Patent
Yin et al.

(10) Patent No.: US 11,321,074 B2
(45) Date of Patent: May 3, 2022

(54) VEHICLE-MOUNTED DEVICE UPGRADE METHOD AND RELATED APPARATUS

(71) Applicant: Huawei Technologies Co., Ltd., Shenzhen (CN)

(72) Inventors: Xinxing Yin, Shenzhen (CN); Zhuo Wei, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/345,542

(22) Filed: Jun. 11, 2021

(65) Prior Publication Data
US 2021/0311720 A1   Oct. 7, 2021

Related U.S. Application Data

(63) Continuation of application No. PCT/CN2020/075427, filed on Feb. 14, 2020.

(51) Int. Cl.
*G06F 8/65*       (2018.01)
*H04L 9/32*       (2006.01)
(Continued)

(52) U.S. Cl.
CPC ............. *G06F 8/65* (2013.01); *H04L 9/3273* (2013.01); *H04L 63/0428* (2013.01);
(Continued)

(58) Field of Classification Search
CPC ..... G06F 8/65; H04L 9/3273; H04L 63/0428; H04L 63/166; H04L 67/02; H04L 67/12; H04L 67/34
See application file for complete search history.

(56) References Cited

U.S. PATENT DOCUMENTS

2013/0179689 A1   7/2013  Matsumoto et al.
2018/0212937 A1*  7/2018  Wang ..................... H04L 12/40
(Continued)

FOREIGN PATENT DOCUMENTS

CN   102004657 A   4/2011
CN   101470411 B   6/2011
(Continued)

OTHER PUBLICATIONS

CN110764804 (Feb. 7, 2020 Publication of CN110764804A, Google translation, 9 pages) (Year: 2020).*
(Continued)

*Primary Examiner* — Oleg Korsak
(74) *Attorney, Agent, or Firm* — Conley Rose, P.C.

(57) ABSTRACT

A vehicle-mounted device upgrade method and a related apparatus, where the method includes an on-board unit (Tbox) of a vehicle that processes a first data segment according to a first algorithm to obtain a first check value, where the first data segment is any data segment in a plurality of data segments included in an upgrade file of a control unit, and the first check value is sent to the control unit, and the Tbox encrypts the first data segment by using a first key to obtain a first encrypted segment, and sends the first encrypted segment to the control unit, so that the control unit stores, in the control unit, the first data segment obtained by decrypting the first encrypted segment by using the first key, where the first data segment is used by the control unit to form the upgrade file for upgrade.

16 Claims, 10 Drawing Sheets

(51) Int. Cl.
  *H04L 29/06* (2006.01)
  *H04L 67/02* (2022.01)
  *H04L 67/12* (2022.01)
  *H04L 67/00* (2022.01)

(52) U.S. Cl.
  CPC ............ *H04L 63/166* (2013.01); *H04L 67/02* (2013.01); *H04L 67/12* (2013.01); *H04L 67/34* (2013.01)

(56) References Cited

U.S. PATENT DOCUMENTS

| | | | |
|---|---|---|---|
| 2019/0034197 A1 | 1/2019 | Lin et al. | |
| 2019/0268420 A1* | 8/2019 | Acharya | H04L 63/0823 |
| 2020/0264864 A1* | 8/2020 | Yang | H04L 9/30 |
| 2021/0051000 A1* | 2/2021 | Yang | H04L 9/088 |

FOREIGN PATENT DOCUMENTS

| | | |
|---|---|---|
| CN | 103885437 A | 6/2014 |
| CN | 106843958 A | 6/2017 |
| CN | 108055585 A | 5/2018 |
| CN | 108449735 A | 8/2018 |
| CN | 110225063 A | 9/2019 |
| CN | 110225124 A | 9/2019 |
| CN | 110300406 A | 10/2019 |
| WO | 2019083440 A2 | 5/2019 |

OTHER PUBLICATIONS

Mckenna et al. (Making Full Vehicle OTA Updates a Reality, 18 pages, Date of release: May 2016) (Year: 2016).*

Nilsson, D., et al., "Secure Firmware Updates over the Air in Intelligent Vehicles," IEEE Communications Society subject matter experts for publication in the ICC 2008 workshop proceedings, May 19, 2008, 5 pages.

* cited by examiner

VEHICLE-MOUNTED DEVICE UPGRADE METHOD AND RELATED APPARATUS

CROSS-REFERENCE TO RELATED APPLICATIONS

This application is a continuation of International Patent Application No. PCT/CN2020/075427 filed on Feb. 14, 2020, the disclosure of which is hereby incorporated by reference in its entirety.

TECHNICAL FIELD

This application relates to the field of information technologies, and in particular, to a vehicle-mounted device upgrade method and a related apparatus.

BACKGROUND

Over-the-air (OTA) is a technology for remotely managing and updating firmware in an electronic device through an air interface. The OTA upgrade is high efficiency, convenience, and low costs. The OTA technology has been deployed on vehicle models of many original equipment manufacturers (OEMs), and is used to upgrade firmware such as an electronic control unit (ECU) of a vehicle. An on-board unit (Tbox) of the vehicle can obtain, by using a wireless link, a software upgrade package released by an OEM cloud server, and write the software upgrade package into the firmware such as the ECU of the vehicle.

However, it is clear that security of the OTA upgrade is insufficiently considered, and there is a security risk in a transmission process of the software upgrade package. For example, important information such as a key algorithm and user privacy that are included in the software upgrade package is easily tampered with and stolen. How to improve security of the transmission process of the software upgrade package is a problem that is being researched by a person skilled in the art.

SUMMARY

Embodiments of this application disclose a vehicle-mounted device upgrade method and a related apparatus, to effectively improve security of an upgrade file transmission process.

According to a first aspect, an embodiment of this application discloses a vehicle-mounted device upgrade method. The method includes processing, by a first vehicle-mounted device, a first data segment according to a first algorithm, to obtain a first check value, where the first data segment is any data segment in a plurality of data segments included in an upgrade file used to upgrade a second vehicle-mounted device, and the first check value is sent to the second vehicle-mounted device, encrypting the first data segment by using a first key, to obtain a first encrypted segment, and sending the first encrypted segment to the second vehicle-mounted device, so that when successfully verifying the first check value according to the first algorithm, the second vehicle-mounted device stores, in the second vehicle-mounted device, the first data segment obtained by decrypting the first encrypted segment by using the first key, where the first data segment is used by the second vehicle-mounted device to form the upgrade file for upgrade.

In the foregoing method, each data segment in the plurality of data segments in the upgrade file used to upgrade the second vehicle-mounted device is separately encrypted and transmitted, to effectively reduce a risk of stealing each data segment. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment, to effectively improve security of an upgrade file transmission process.

In an optional solution of the first aspect, before the processing, by a first vehicle-mounted device, a first data segment according to a first algorithm, to obtain a first check value, the method further includes performing two-way authentication between the first vehicle-mounted device and a download server according to a Hypertext Transfer Protocol (HTTP) Secure (HTTPS), where the download server is configured to provide the upgrade file for the second vehicle-mounted device, receiving an encrypted file sent by the download server, where the encrypted file is obtained by encrypting the upgrade file, and decrypting the encrypted file when a preset upgrade condition is met, to obtain the upgrade file.

It can be learned that the download server that provides the upgrade file is a server that performs two-way authentication with the first vehicle-mounted device according to the HTTPS protocol, so that a source of the upgrade file is valid, an unauthorized platform is prevented from delivering a malicious upgrade file to the first vehicle-mounted device, and an attacker is prevented from forging the first vehicle-mounted device to steal the upgrade file that is released by the download server and that includes important information. In addition, the encrypted upgrade file is transmitted between the download server and the first vehicle-mounted device, so that a risk of stealing the upgrade file can be effectively reduced, and security of an upgrade file transmission process effectively improved.

In another optional solution of the first aspect, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution of the first aspect, the first encrypted segment is obtained by encrypting the first data segment and the first check value by using the first key.

It can be learned that the first check value may be further encrypted while the first data segment is encrypted. This further improves security of an upgrade file transmission process.

In another optional solution of the first aspect, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution of the first aspect, the first key is a key obtained by performing two-way authentication negotiation between the first vehicle-mounted device and the second vehicle-mounted device according to Transport Layer Security (TLS).

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution of the first aspect, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

According to a second aspect, an embodiment of this application provides a vehicle-mounted device upgrade method, including receiving, by a second vehicle-mounted device, a first encrypted segment sent by a first vehicle-mounted device, where the first encrypted segment is obtained by encrypting a first data segment by using a first key, and the first data segment is any data segment in a plurality of data segments included in an upgrade file used to upgrade the second vehicle-mounted device, decrypting the first encrypted segment by using the first key, to obtain the first data segment, when successfully verifying a first check value according to the first algorithm, storing the first data segment in the second vehicle-mounted device, where the first check value is obtained by the first vehicle-mounted device by processing the first data segment according to the first algorithm, and the first check value is received by the second vehicle-mounted device from the first vehicle-mounted device, and forming the upgrade file based on the first data segment for upgrade.

In the foregoing method, each data segment in the plurality of data segments in the upgrade file used to upgrade the second vehicle-mounted device is separately encrypted and transmitted, to effectively reduce a risk of stealing each data segment. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment. This effectively improves security of an upgrade file transmission process.

In an optional solution of the second aspect, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution of the second aspect, the first encrypted segment is obtained by encrypting the first data segment and the first check value by using the first key.

It can be learned that the first check value may be further encrypted while the first data segment is encrypted. This further improves security of an upgrade file transmission process.

In another optional solution of the second aspect, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution of the second aspect, the first key is a key obtained by performing two-way authentication negotiation between the first vehicle-mounted device and the second vehicle-mounted device according to TLS.

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution of the second aspect, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

According to a third aspect, an embodiment of this application provides a vehicle-mounted device upgrade method, applied to a vehicle. The vehicle includes a first vehicle-mounted device and a second vehicle-mounted device. The method includes processing, by a first vehicle-mounted device, a first data segment according to a first algorithm, to obtain a first check value, where the first data segment is any data segment in a plurality of data segments included in an upgrade file used to upgrade a second vehicle-mounted device, and the first check value is sent to the second vehicle-mounted device, encrypting, by the first vehicle-mounted device, the first data segment by using a first key, to obtain a first encrypted segment, sending, by the first vehicle-mounted device, the first encrypted segment to the second vehicle-mounted device, receiving, by the second vehicle-mounted device, the first encrypted segment sent by the first vehicle-mounted device, decrypting, by the second vehicle-mounted device, the first encrypted segment by using the first key, to obtain the first data segment, when successfully verifying the first check value according to the first algorithm, storing, by the second vehicle-mounted device, the first data segment in the second vehicle-mounted device, and forming, by the second vehicular device, the upgrade file based on the first data segment for upgrade.

In the foregoing method, each data segment in the plurality of data segments in the upgrade file used to upgrade the second vehicle-mounted device is separately encrypted and transmitted, to effectively reduce a risk of stealing each data segment. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment. This effectively improves security of an upgrade file transmission process.

In an optional solution of the third aspect, before the processing, by a first vehicle-mounted device, a first data segment according to a first algorithm, to obtain a first check value, the method further includes performing two-way authentication between the first vehicle-mounted device and a download server according to an HTTPS protocol, where the download server is configured to provide the upgrade file for the second vehicle-mounted device, receiving, by the first vehicle-mounted device, an encrypted file sent by the download server, where the encrypted file is obtained by encrypting the upgrade file, and decrypting, by the first vehicle-mounted device, the encrypted file when a preset upgrade condition is met, to obtain the upgrade file.

It can be learned that the download server that provides the upgrade file is a server that performs two-way authentication with the first vehicle-mounted device according to the HTTPS protocol, so that a source of the upgrade file is valid, an unauthorized platform is prevented from delivering a malicious upgrade file to the first vehicle-mounted device, and an attacker is prevented from forging the first vehicle-mounted device to steal the upgrade file that is released by the download server and that includes important information. In addition, the encrypted upgrade file is transmitted between the download server and the first vehicle-mounted device, so that a risk of stealing the upgrade file can be effectively reduced, and security of an upgrade file transmission process effectively improved.

In another optional solution of the third aspect, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution of the third aspect, the first encrypted segment is obtained by encrypting the first data segment and the first check value by using the first key.

It can be learned that the first check value may be further encrypted while the first data segment is encrypted. This further improves security of an upgrade file transmission process.

In another optional solution of the third aspect, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution of the third aspect, the first key is a key obtained by performing two-way authentication negotiation between the first vehicle-mounted device and the second vehicle-mounted device according to TLS.

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution of the third aspect, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

According to a fourth aspect, an embodiment of this application provides a first vehicle-mounted device, including a processing unit, configured to process a first data segment according to a first algorithm, to obtain a first check value, where the first data segment is any data segment in a plurality of data segments included in an upgrade file used to upgrade a second vehicle-mounted device, and the first check value is sent to the second vehicle-mounted device, an encryption unit, configured to encrypt the first data segment by using a first key, to obtain a first encrypted segment, and a communications unit, configured to send the first encrypted segment to the second vehicle-mounted device, so that when successfully verifying the first check value according to the first algorithm, the second vehicle-mounted device stores, in the second vehicle-mounted device, the first data segment obtained by decrypting the first encrypted segment by using the first key, where the first data segment is used by the second vehicle-mounted device to form the upgrade file for upgrade.

In the foregoing apparatus, each data segment in the plurality of data segments in the upgrade file used to upgrade the second vehicle-mounted device is separately encrypted and transmitted, to effectively reduce a risk of stealing each data segment. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment. This effectively improves security of an upgrade file transmission process.

In an optional solution of the fourth aspect, the first vehicle-mounted device further includes a negotiation unit and a decryption unit.

The negotiation unit is configured to, before the processing unit processes the first data segment according to the first algorithm to obtain the first check value, perform two-way authentication with a download server according to HTTPS. The download server is configured to provide the upgrade file for the second vehicle-mounted device.

The communications unit is further configured to receive an encrypted file sent by the download server. The encrypted file is obtained by encrypting the upgrade file.

The decryption unit is configured to decrypt the encrypted file when a preset upgrade condition is met, to obtain the upgrade file.

It can be learned that the download server that provides the upgrade file is a server that performs two-way authentication with the first vehicle-mounted device according to the HTTPS protocol, so that a source of the upgrade file is valid, an unauthorized platform is prevented from delivering a malicious upgrade file to the first vehicle-mounted device, and an attacker is prevented from forging the first vehicle-mounted device to steal the upgrade file that is released by the download server and that includes important information. In addition, the encrypted upgrade file is transmitted between the download server and the first vehicle-mounted device, so that a risk of stealing the upgrade file can be effectively reduced, and security of an upgrade file transmission process effectively improved.

In another optional solution of the fourth aspect, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution of the fourth aspect, the first encrypted segment is obtained by encrypting the first data segment and the first check value by using the first key.

It can be learned that the first check value may be further encrypted while the first data segment is encrypted. This further improves security of an upgrade file transmission process.

In another optional solution of the fourth aspect, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution of the fourth aspect, the first key is a key obtained by performing two-way authentication negotiation between the first vehicle-mounted device and the second vehicle-mounted device according to TLS.

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution of the fourth aspect, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

According to a fifth aspect, an embodiment of this application provides a second vehicle-mounted device, including a communications unit, configured to receive a first encrypted segment sent by a first vehicle-mounted device, where the first encrypted segment is obtained by encrypting a first data segment by using a first key, and the first data segment is any data segment in a plurality of data segments included in an upgrade file used to upgrade the second vehicle-mounted device, a decryption unit, configured to decrypt the first encrypted segment by using the first key, to obtain the first data segment, a verification unit, configured to, when successfully verifying a first check value according to the first algorithm, store the first data segment in the second vehicle-mounted device, where the first check value is obtained by the first vehicle-mounted device by processing the first data segment according to the first algorithm, and the first check value is received by the second vehicle-mounted device from the first vehicle-mounted device, and an upgrade unit, configured to form the upgrade file based on the first data segment for upgrade.

In the foregoing apparatus, each data segment in the plurality of data segments in the upgrade file used to upgrade the second vehicle-mounted device is separately encrypted and transmitted, to effectively reduce a risk of stealing each data segment. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment. This effectively improves security of an upgrade file transmission process.

In an optional solution of the fifth aspect, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution of the fifth aspect, the first encrypted segment is obtained by encrypting the first data segment and the first check value by using the first key.

It can be learned that the first check value may be further encrypted while the first data segment is encrypted. This further improves security of an upgrade file transmission process.

In another optional solution of the fifth aspect, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution of the fifth aspect, the first key is a key obtained by performing two-way authentication negotiation between the first vehicle-mounted device and the second vehicle-mounted device according to TLS.

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution of the fifth aspect, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

According to a sixth aspect, an embodiment of this application provides a first vehicle-mounted device, the first vehicle-mounted device includes a transceiver, a processor, and a memory, the memory is configured to store a computer program, and the processor invokes the computer program to perform the following operations of processing a first data segment according to a first algorithm, to obtain a first check value, where the first data segment is any data segment in a plurality of data segments included in an upgrade file used to upgrade a second vehicle-mounted device, and the first check value is sent to the second vehicle-mounted device, encrypting the first data segment by using a first key, to obtain a first encrypted segment, and controlling the transceiver to send the first encrypted segment to the second vehicle-mounted device, so that when successfully verifying the first check value according to the first algorithm, the second vehicle-mounted device stores, in the second vehicle-mounted device, the first data segment obtained by decrypting the first encrypted segment by using the first key, where the first data segment is used by the second vehicle-mounted device to form the upgrade file for upgrade.

In the foregoing apparatus, each data segment in the plurality of data segments in the upgrade file used to upgrade the second vehicle-mounted device is separately encrypted and transmitted, to effectively reduce a risk of stealing each data segment. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment. This effectively improves security of an upgrade file transmission process.

In an optional solution of the sixth aspect, before the processing a first data segment according to a first algorithm, to obtain a first check value, the processor is further configured to perform two-way authentication with a download server according to an HTTPS protocol, where the download server is configured to provide the upgrade file for the second vehicle-mounted device, control the transceiver to receive an encrypted file sent by the download server, where the encrypted file is obtained by encrypting the upgrade file, and decrypt the encrypted file when a preset upgrade condition is met, to obtain the upgrade file.

It can be learned that the download server that provides the upgrade file is a server that performs two-way authentication with the first vehicle-mounted device according to the HTTPS protocol, so that a source of the upgrade file is valid, an unauthorized platform is prevented from delivering a malicious upgrade file to the first vehicle-mounted device, and an attacker is prevented from forging the first vehicle-mounted device to steal the upgrade file that is released by the download server and that includes important information. In addition, the encrypted upgrade file is transmitted between the download server and the first vehicle-mounted device, so that a risk of stealing the upgrade file can be effectively reduced, and security of an upgrade file transmission process effectively improved.

In another optional solution of the sixth aspect, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution of the sixth aspect, the first encrypted segment is obtained by encrypting the first data segment and the first check value by using the first key.

It can be learned that the first check value may be further encrypted while the first data segment is encrypted. This further improves security of an upgrade file transmission process.

In another optional solution of the sixth aspect, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution of the sixth aspect, the first key is a key obtained by performing two-way authentication negotiation between the first vehicle-mounted device and the second vehicle-mounted device according to TLS.

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution of the sixth aspect, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

According to a seventh aspect, an embodiment of this application provides a second vehicle-mounted device. The second vehicle-mounted device includes a transceiver, a processor, and a memory. The memory is configured to store a computer program, and the processor invokes the computer program to perform the following operations of controlling the transceiver to receive a first encrypted segment sent by a first vehicle-mounted device, where the first encrypted segment is obtained by encrypting a first data segment by using a first key, and the first data segment is any data segment in a plurality of data segments included in an upgrade file used to upgrade the second vehicle-mounted device, decrypting the first encrypted segment by using the first key, to obtain the first data segment, when successfully verifying a first check value according to the first algorithm, storing the first data segment in the second vehicle-mounted device, where the first check value is obtained by the first vehicle-mounted device by processing the first data segment according to the first algorithm, and the first check value is received by the second vehicle-mounted device from the first vehicle-mounted device, and forming the upgrade file based on the first data segment for upgrade.

In the foregoing apparatus, each data segment in the plurality of data segments in the upgrade file used to upgrade the second vehicle-mounted device is separately encrypted and transmitted, to effectively reduce a risk of stealing each data segment. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment. This effectively improves security of an upgrade file transmission process.

In another optional solution of the seventh aspect, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution of the seventh aspect, the first encrypted segment is obtained by encrypting the first data segment and the first check value by using the first key.

It can be learned that the first check value may be further encrypted while the first data segment is encrypted. This further improves security of an upgrade file transmission process.

In another optional solution of the seventh aspect, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution of the seventh aspect, the first key is a key obtained by performing two-way authentication negotiation between the first vehicle-mounted device and the second vehicle-mounted device according to TLS.

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution of the seventh aspect, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

According to an eighth aspect, an embodiment of this application provides a vehicle, including a first vehicle-mounted device and a second vehicle-mounted device. The first vehicle-mounted device is the first vehicle-mounted device described in any one of the fourth aspect or the possible implementations of the fourth aspect. The second vehicle-mounted device is the second vehicle-mounted device described in any one of the fifth aspect or the possible implementations of the fifth aspect.

According to a ninth aspect, an embodiment of this application provides a vehicle, including a first vehicle-mounted device and a second vehicle-mounted device. The first vehicle-mounted device is the first vehicle-mounted device described in any one of the sixth aspect or the possible implementations of the sixth aspect. The second vehicle-mounted device is the second vehicle-mounted device described in any one of the seventh aspect or the possible implementations of the seventh aspect.

According to a tenth aspect, an embodiment of this application provides a computer-readable storage medium. The computer-readable storage medium stores an instruction, and when the instruction is run on a processor, the method described in any one of the first aspect and the second aspect or the optional solutions of any one of the first aspect and the second aspect is implemented.

DESCRIPTION OF EMBODIMENTS

The following describes the embodiments of this application with reference to the accompanying drawings in the embodiments of this application.

Figure 1:
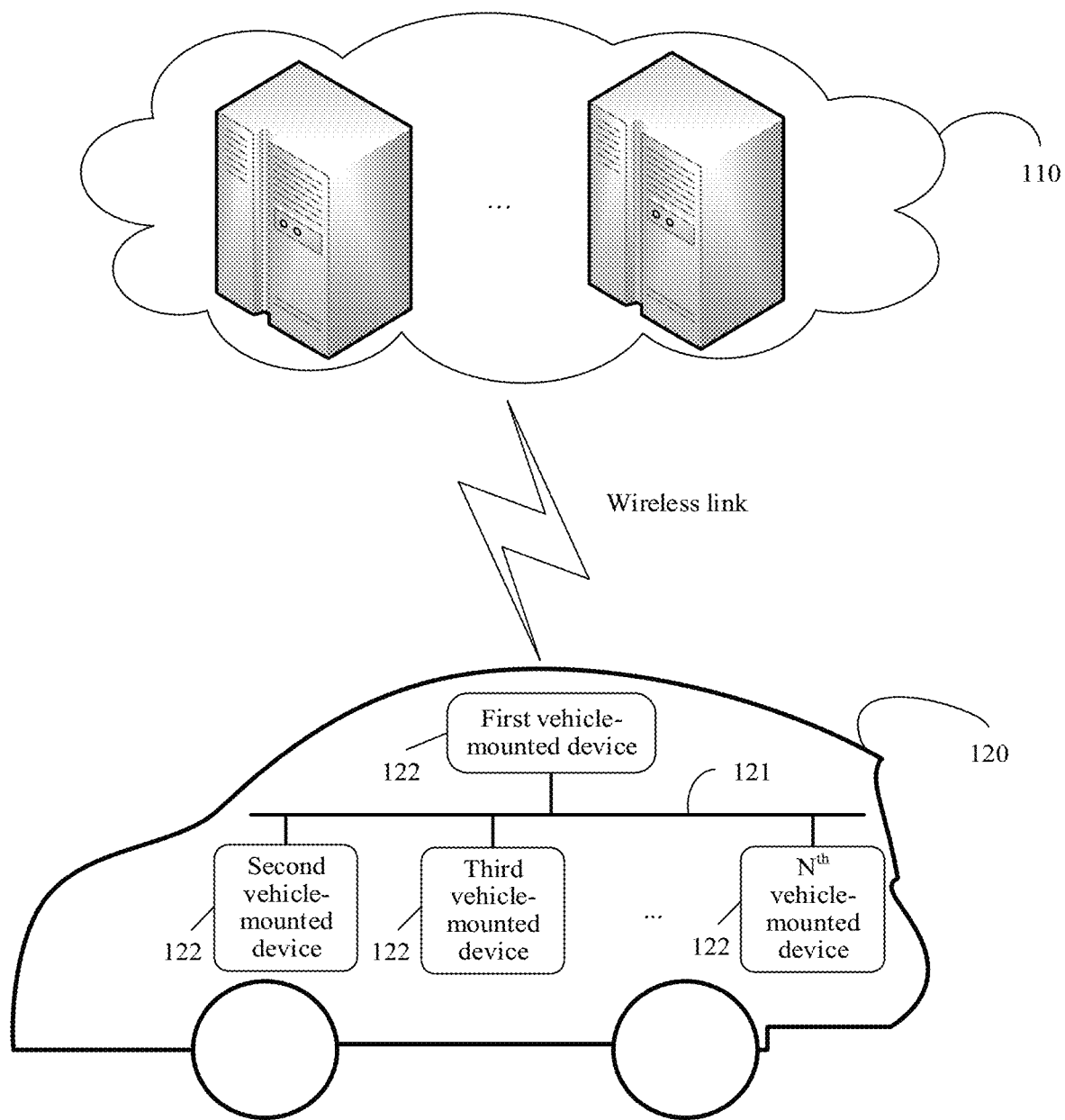
FIG. 1 is a schematic architectural diagram of a vehicle-mounted device upgrade system according to an embodiment of this application.

FIG. 1 is a schematic architectural diagram of a vehicle-mounted device upgrade system according to an embodiment of this application. The schematic architectural diagram includes a download server 110 and a vehicle 120. The server 110 and the vehicle 120 may perform communication download by using a wireless link (for example, WI-FI, BLUETOOTH, and a mobile device network). The vehicle 120 includes a communications bus 121 and a plurality of vehicle-mounted devices 122 that communicate with each other by using the communications bus 121. A specific quantity of the plurality of vehicle-mounted devices 122 is not limited herein.

The download server 110 may be a server that is set by an OEM and that is configured to provide an upgrade file for the vehicle 120. The download server 110 may be a single server, or may be a server cluster including a plurality of servers. The download server 110 may be a hardware server, or may be a cloud server. This is not limited herein.

The vehicle 120 may also be a device such as a smart vehicle or a smart "charge dog" (a movable device configured to charge a smart vehicle). The communications bus 121 may be, but is not limited to, a Local Interconnect Network (LIN) bus, a Controller Area Network (CAN) bus, or the like. The vehicle-mounted device 122 may be an electronic device or a control unit that is in the vehicle 120 and that can upgrade a system by using the upgrade file, for example, an ECU, or a vehicle control unit (VCU). Alternatively, the vehicle-mounted device 122 may be an electronic device that is in the vehicle 120 and that can obtain, by using the wireless link, the upgrade file provided by the download server 110, and transfer the upgrade file to another vehicle-mounted device that needs to upgrade the system, for example, an Tbox. There are various types of ECUs, and different ECUs may be configured to implement different functions, for example, a gateway (GW), an automatic transmission control unit (TCU), and an auxiliary control unit (ACU).

The Tbox in the vehicle 120 may communicate with the download server 110 by using the wireless link. For example, the Tbox may obtain, by using the wireless link, the upgrade file that is released by the download server 110 and that is used to upgrade the control unit (such as the ECU or the VCU) of the vehicle 120, and write, by segment and according to a protocol specification of Unified Diagnostic Services (UDS), the upgrade file into an address unit corresponding to a flash of the corresponding control unit, to complete an OTA process.

For ease of description, the Tbox is referred to as a first vehicle-mounted device below, and the control unit (for example, the ECU or the VCU) that assists in writing the upgrade file by segment by using the Tbox is referred to as a second vehicle-mounted device below.

Figure 2A:
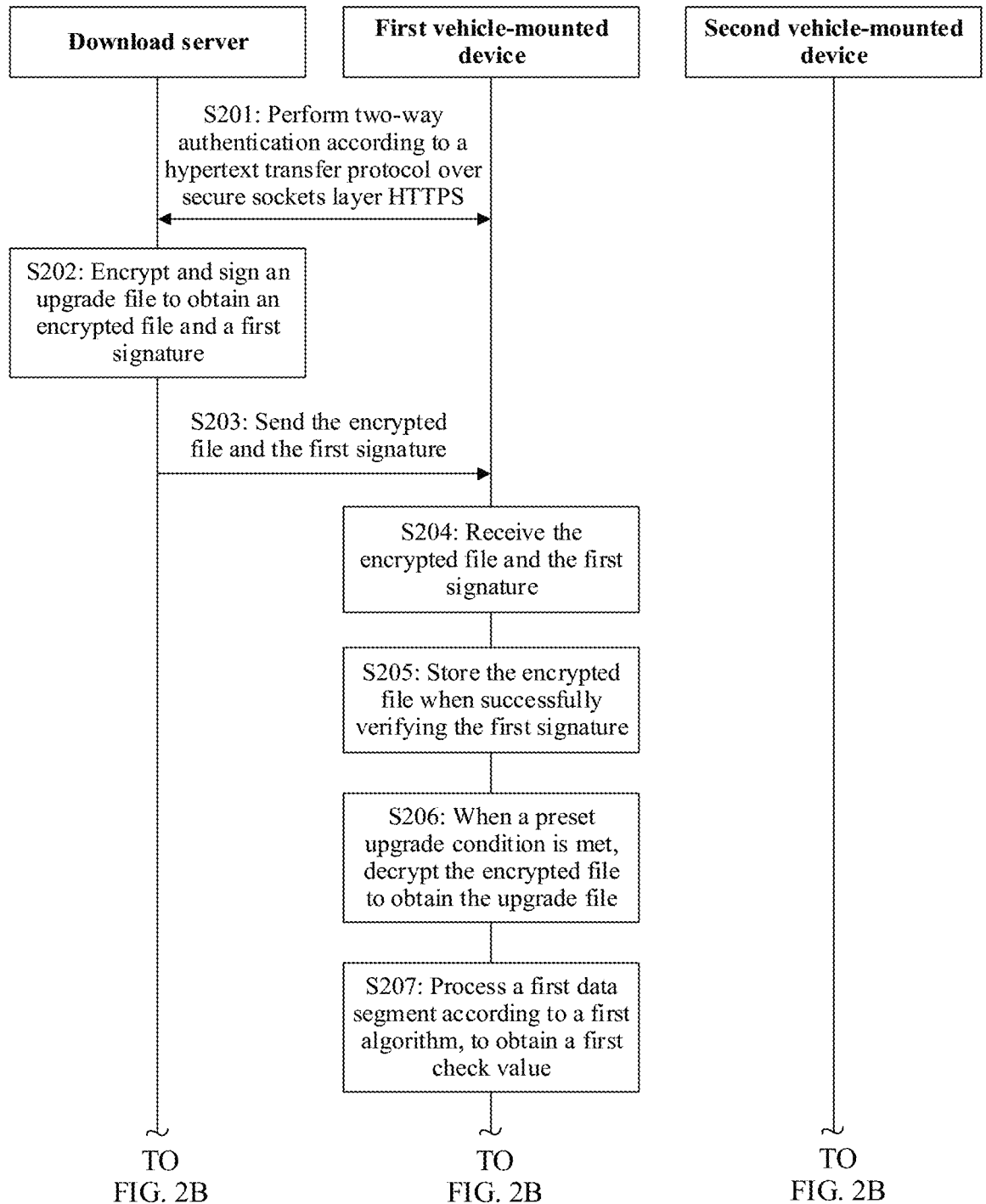
FIG. 2A and FIG. 2B are a schematic flowchart of a vehicle-mounted device upgrade method according to an embodiment of this application.
Figure 2B:
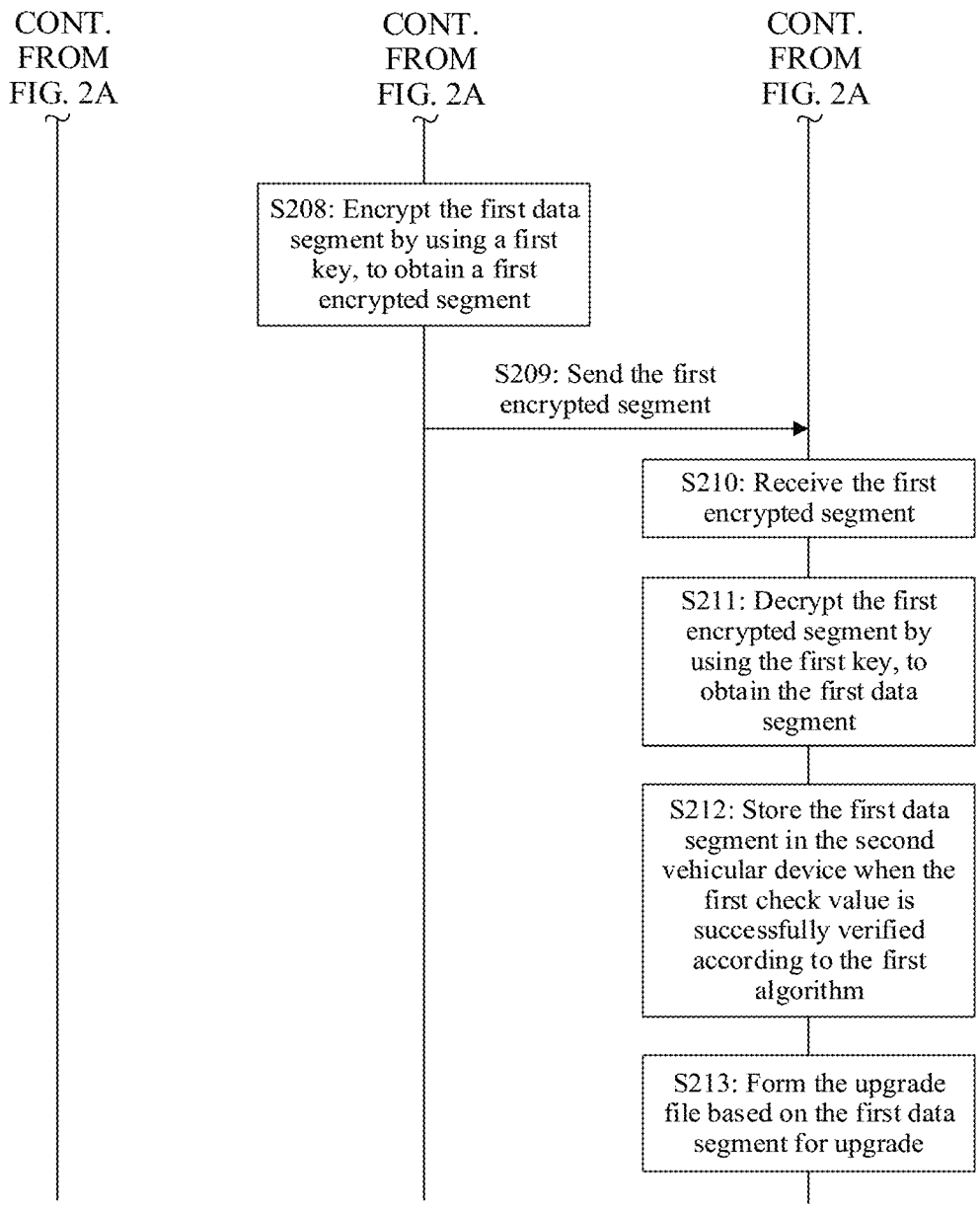

FIG. 2A and FIG. 2B show a vehicle-mounted device upgrade method according to an embodiment of this application. The method may be implemented based on the vehicle-mounted device upgrade system shown in FIG. 1. The method includes but is not limited to the following steps.

Step S201: Two-way authentication is performed between a download server and a first vehicle-mounted device according to an HTTPS.

Further, the download server is configured to provide an upgrade file for a second vehicle-mounted device by using the first vehicle-mounted device.

Further, the HTTPS protocol may be understood as a protocol that ensures security of a transmission process according to an HTTP by using a SSL or a TLS. Compared with the SSL protocol, the TLS protocol is updated, and is more widely applied. In this embodiment of this application, the TLS protocol is used as an example for description.

The HTTPS two-way authentication is actually a TLS two-way authentication which is also referred to as a TLS handshake protocol interaction process. In the two-way authentication process, the download server sends a root certificate or an OTA certificate of the download server to the first vehicle-mounted device, so that the first vehicle-mounted device performs identity authentication on the download server. Similarly, the first vehicle-mounted device also sends a device certificate of the first vehicle-mounted device to the download server, so that the download server performs identity authentication on the first vehicle-mounted device. The OTA certificate may be a certificate that is derived by the download server based on the root certificate and that is used for secure interaction with the first vehicle-mounted device.

In this embodiment of this application, the two-way authentication is performed between the download server and the first vehicle-mounted device according to the HTTPS protocol, so that an unauthorized download server can be effectively prevented from releasing a malicious upgrade file to the first vehicle-mounted device, and an attacker can be prevented from forging the authorized first vehicle-mounted device to steal the upgrade file that is released by the download server and that includes important information such as a key experience calibration configuration, a key algorithm, and user privacy.

Step S202: The download server encrypts and signs the upgrade file to obtain an encrypted file and a first signature.

Further, the upgrade file is used to upgrade the second vehicle-mounted device. The download server may encrypt the upgrade file by using a second key, to obtain the encrypted file. The second key may be a key randomly generated by the download server, or may be a key obtained through pre-negotiation between the download server and the first vehicle-mounted device, or may be a key preconfigured (for example, configured by using a trusted third-party device), or certainly may be a key obtained in another manner. The download server may sign the upgrade file by using a private key of a first certificate, to obtain a first signature. The first certificate may be the root certificate of the download server, or may be the foregoing OTA certificate, or certainly may be another certificate that can identify an identity of the download server.

Step S203: The download server sends the encrypted file and the first signature to the first vehicle-mounted device.

Step S204: The first vehicle-mounted device receives the encrypted file and the first signature.

Step S205: The first vehicle-mounted device stores the encrypted file when successfully verifying the first signature.

Further, the first signature is used to verify integrity of the upgrade file sent by the download server and validity of a source of the upgrade file (to be specific, the download server). The download server may sign the upgrade file by using the certificate that can identify the identity of the download server, to obtain the first signature, and send the first signature to the first vehicle-mounted device. Correspondingly, the first vehicle-mounted device may verify the first signature by using a public key of the certificate that can identify the identity of the download server. When successfully verifying the first signature, the first vehicle-mounted device considers that the upgrade file has not been tampered with (in other words, the integrity verification succeeds), and considers that a node that sends the encrypted file and the first signature is the download server (in other words, the validity verification succeeds). A specific manner in which the download server performs signing and a specific manner in which the first vehicle-mounted device verifies a signature are not limited in this embodiment of this application. For ease of understanding, the following describes several optional signature verification solutions.

Optionally, if the first certificate is the root certificate of the download server, the first certificate used by the first vehicle-mounted device may be sent by the download server to the first vehicle-mounted device. Correspondingly, the first vehicle-mounted device verifies the first signature by using a public key of the root certificate.

Optionally, if the first certificate is the OTA certificate, the first certificate used by the first vehicle-mounted device may be sent by the download server to the first vehicle-mounted device, and the download server further sends the root certificate of the download server to the first vehicle-mounted device. Correspondingly, the first vehicle-mounted device verifies validity of the received OTA certificate by using the root certificate, and if the verification succeeds, verifies the first signature by using a public key of the OTA certificate.

In this embodiment of this application, if the verification of the first signature succeeds, the encrypted file is stored. If the validity verification of the OTA certificate fails or the verification of the first signature fails, the first vehicle-mounted device reports an alarm indicating that the encrypted file is abnormal to a vehicle-mounted device, for example, a VCU, that is in the vehicle and that is configured to implement fault diagnosis and protection for a vehicle system.

Step S206: When a preset upgrade condition is met, the first vehicle-mounted device decrypts the encrypted file to obtain the upgrade file.

Further, the preset upgrade condition may be, but is not limited to, that the vehicle receives an upgrade instruction, that the vehicle is in a static state, or the like. The upgrade instruction may be, but is not limited to, indicated by a user by using a vehicle-mounted terminal built in the vehicle, or indicated by a user by using an internet of vehicles application (APP) wirelessly connected to the vehicle. When the preset upgrade condition is not met, the upgrade file is stored in the first vehicle-mounted device in a form of an encrypted file. When the preset upgrade condition is met, the first vehicle-mounted device decrypts the encrypted file by using the second key, to obtain the upgrade file, instead of immediately decrypting the received encrypted file to obtain and store the upgrade file, to prevent the upgrade file from being stolen or tampered with during storage, and to ensure security of the upgrade file.

Optionally, if the second key is a key randomly generated by the download server, the download server may further encrypt the second key by using a public key of the device certificate of the first vehicle-mounted device, and send an encrypted second key to the first vehicle-mounted device. Correspondingly, the first vehicle-mounted device receives the encrypted second key sent by the download server, and then decrypts the encrypted second key by using a private key of the device certificate of the first vehicle-mounted device, to obtain the second key. The second key obtained in this manner is used by the first vehicle-mounted device to decrypt the encrypted file to obtain the upgrade file.

Optionally, the first vehicle-mounted device may decrypt the encrypted file immediately after receiving the encrypted file, to obtain and store the upgrade file. Certainly, the upgrade file obtained in this manner has relatively low security.

Step S207: The first vehicle-mounted device processes a first data segment according to a first algorithm, to obtain a first check value.

Further, the first vehicle-mounted device may divide the upgrade file into a plurality of data segments based on a receiving capability of the second vehicle-mounted device. For example, n data segments are used for description. For example, a size of the upgrade file is 64 bytes, a size of a data packet that can be received by the second vehicle-mounted device each time is 8 bytes, and thus the first vehicle-mounted device needs to divide the 64-byte upgrade file into eight data segments. The first vehicle-mounted device sends one data segment of the n data segments to the second vehicle-mounted device each time, and when all the n data segments are sent to the second vehicle-mounted device, completes a process of writing the upgrade file by segment.

The first data segment is any data segment in the plurality of data segments included in the upgrade file, in other words, a feature of each data segment in the plurality of data segments is applicable to subsequent related descriptions of the first data segment.

In addition, the first algorithm and the first check value are used to ensure integrity of each data segment. The following uses examples for description in different cases.

Case 1: The first algorithm is a hash algorithm, for example, Secure Hash Algorithm (SHA)-256, SHA-384, SHA-512, Message Digest (MD)2, MD4 or MD5, and the first check value is a hash value corresponding to the first data segment.

If the first data segment is the first data segment in the plurality of data segments in the upgrade file, the first check value is output data obtained by using the first data segment as an input of the first algorithm.

If the first data segment is a data segment other than the first data segment in the plurality of data segments in the upgrade file, the first check value is output data obtained by using the first data segment and the second check value as inputs of the first algorithm. The second check value is obtained by processing a previous data segment of the first data segment according to the first algorithm.

For example, if the upgrade file includes three data segments, which are data 1, data 2, and data 3 in sequence, and the first algorithm is the MD5 algorithm, then if the first data segment is the data 1, a first check value is that check 1=MD5 (data 1), if the first data segment is the data 2, a first check value is that check 2=MD5 (data 2, check 1), or if the first data segment is the data 3, a first check value is that check 3=MD5 (data 3, check 2).

Case 2: The first algorithm is an algorithm used to calculate message authentication code (MAC), for example, a hash-based MAC (HMAC) algorithm which is dedicated to calculating the MAC, or an encryption algorithm, for example, a Data Encryption Standard (DES) algorithm. The first check value is a MAC of the first data segment obtained by processing the first data segment according to the TLS protocol and the first algorithm.

For example, if the upgrade file includes two data segments which are data 1 and data 2 in sequence, and the first algorithm is the HMAC algorithm, then if the first data segment is the data 1, a first check value is that check 1=HMAC (data 1), or if the first data segment is the data 2, a first check value is that check 2=HMAC (data 2).

Step S208: The first vehicle-mounted device encrypts the first data segment by using a first key, to obtain a first encrypted segment.

For the case 1, the first key may be a pre-shared key (PSK) pre-configured for the first vehicle-mounted device and the second vehicle-mounted device, or may be a key obtained through negotiation between the first vehicle-mounted device and the second vehicle-mounted device according to a security algorithm or a security protocol, for example, the TLS protocol. The first vehicle-mounted device may encrypt the first data segment and the first check value by using the first key, to obtain the first encrypted segment.

For the case 2, the first key may be a key obtained through negotiation according to the security protocol such as the TLS protocol. The first vehicle-mounted device may encrypt the first data segment by using the first key, to obtain the first encrypted segment.

Step S209: The first vehicle-mounted device sends the first encrypted segment to the second vehicle-mounted device.

For the case 1, the first vehicle-mounted device sends the first encrypted segment to the second vehicle-mounted device, where the first encrypted segment is obtained by the first vehicle-mounted device by encrypting the first data segment and the first check value according to the first algorithm.

For the case 2, the first vehicle-mounted device sends the first encrypted segment and the first check value to the second vehicle-mounted device.

Step S210: The second vehicle-mounted device receives the first encrypted segment.

For the case 1, the second vehicle-mounted device receives the first encrypted segment sent by the first vehicle-mounted device. The first encrypted segment is obtained by the first vehicle-mounted device by encrypting the first data segment and the first check value according to the first algorithm.

For the case 2, the second vehicle-mounted device receives the first encrypted segment and the first check value that are sent by the first vehicle-mounted device.

Step S211: The second vehicle-mounted device decrypts the first encrypted segment by using the first key, to obtain the first data segment.

For the case 1, the second vehicle-mounted device, optionally, for example, a bootloader in the second vehicle-mounted device, decrypts the first encrypted segment by using the first key, to obtain the first data segment and the first check value.

For the case 2, the second vehicle-mounted device, optionally, for example, a bootloader in the second vehicle-mounted device, decrypts the first encrypted segment by using the first key, to obtain the first data segment.

Step S212: The second vehicle-mounted device stores the first data segment in the second vehicle-mounted device when the first check value is successfully verified according to the first algorithm.

Further, the second vehicle-mounted device, optionally, for example, the bootloader in the second vehicle-mounted device, calculates, according to the first algorithm, a check value corresponding to the first data segment obtained through decryption, and then compares the check value with the first check value through reception or decryption. If the check value is the same as the first check value obtained through reception or decryption, and the integrity verification succeeds, the second vehicle-mounted device stores the first data segment in an address unit corresponding to a flash of the second vehicle-mounted device. If the check value and the first check value obtained through reception or decryption are different, and the integrity verification fails, the second vehicle-mounted device stops the process of writing the upgrade file, and reports an alarm indicating that the first data segment is abnormal to the vehicle-mounted device, for example, the VCU, that is in the vehicle and that is configured to implement fault diagnosis and protection for a vehicle system.

Step S213: The second vehicle-mounted device forms the upgrade file based on the first data segment for upgrade.

Further, the steps S207 to S212 correspond to a secure writing process of one data segment, and each data segment in the n data segments of the upgrade file is written into the second vehicle-mounted device in the manner described in the steps S207 to S212. After the n data segments are all written into the second vehicle-mounted device, the second vehicle-mounted device may assemble the n data segments to obtain an upgrade file, and upgrade the system based on the upgrade file.

In the foregoing method, each data segment in the plurality of data segments in the upgrade file used to upgrade the second vehicle-mounted device is separately encrypted and transmitted, to effectively reduce a risk of stealing each data segment in an in-vehicle transmission process, and ensure confidentiality of each data segment in the in-vehicle transmission process. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment, to avoid a case in which the second vehicle-mounted device works abnormally or resources are wasted because the abnormal data segment is written into the second vehicle-mounted device, to ensure integrity of each data segment, and to effectively improve security of the upgrade file transmission process.

The foregoing method embodiment shown in FIG. 2A and FIG. 2B includes many possible implementation solutions. The following separately illustrates some of the implementation solutions with reference to FIG. 3A, FIG. 3B, FIG. 4A, FIG. 4B, and FIG. 5. It should be noted that, for descriptions of related concepts, operations, or logical relationships that are not explained in FIG. 3A, FIG. 3B, FIG. 4A, FIG. 4B, and FIG. 5, refer to corresponding descriptions in the embodiment shown in FIG. 2A and FIG. 2B. Therefore, details are not described again.

Figure 3A:
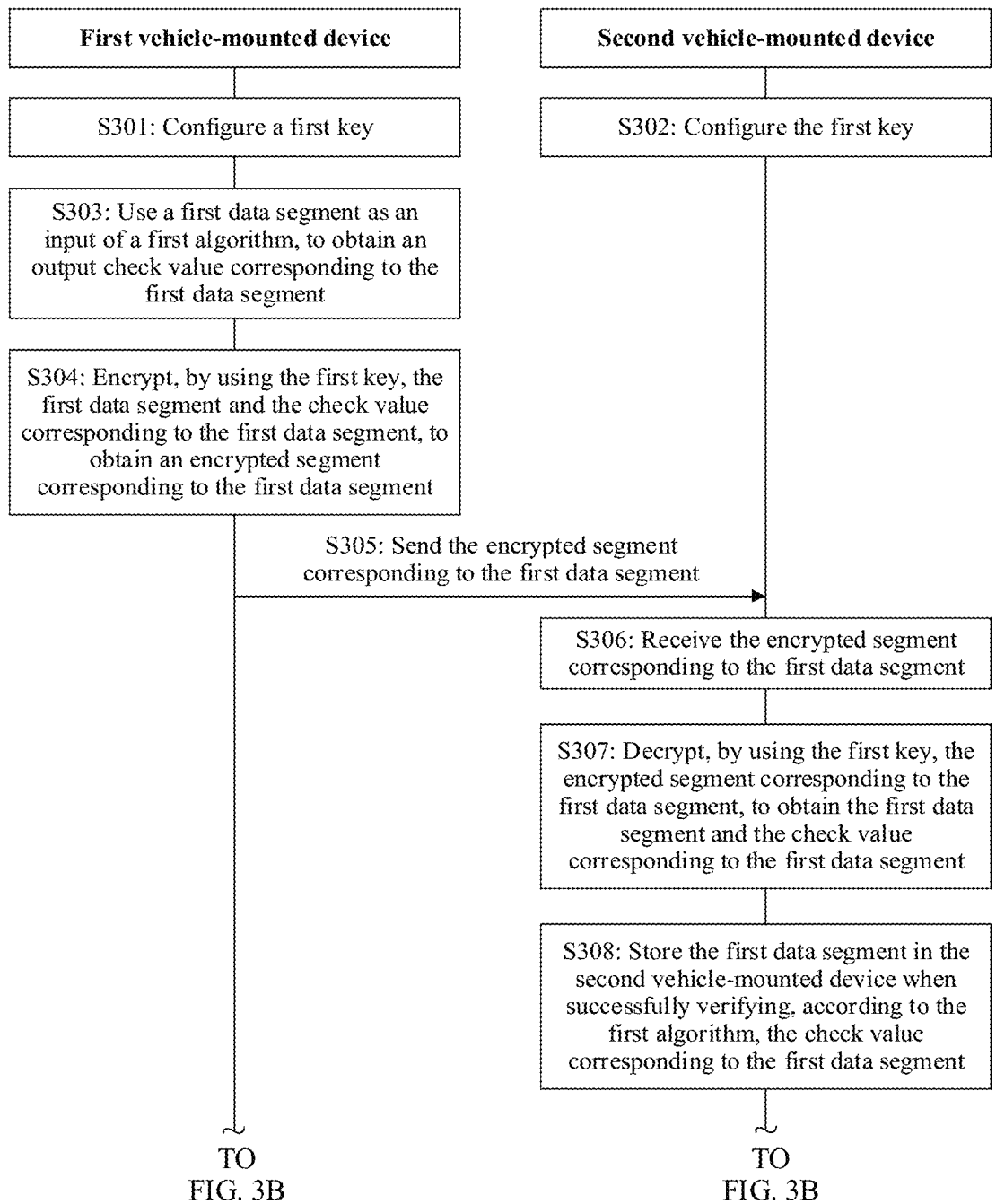
FIG. 3A and FIG. 3B are a schematic flowchart of another vehicle-mounted device upgrade method according to an embodiment of this application.
Figure 3B:
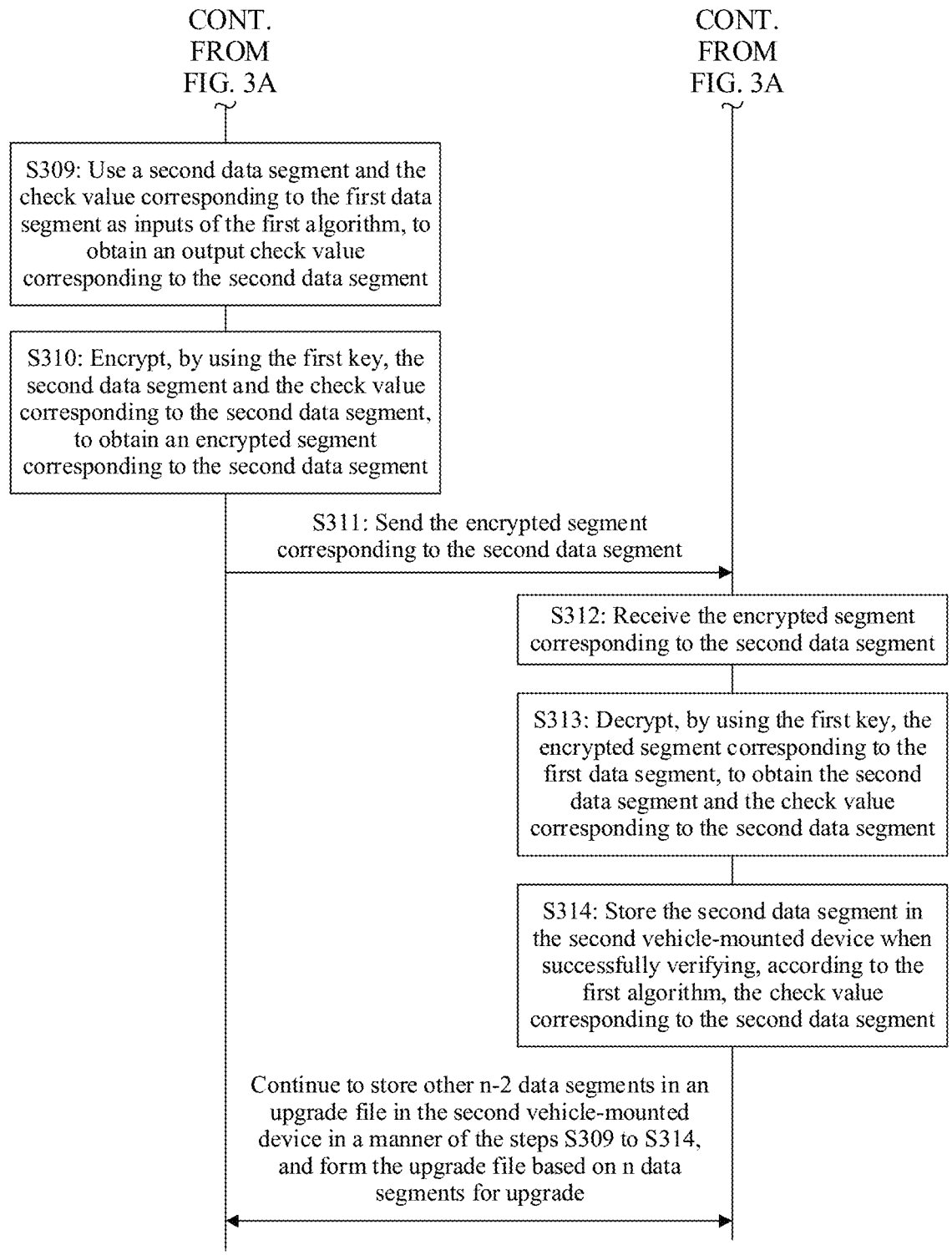

FIG. 3A and FIG. 3B are a schematic flowchart of another vehicle-mounted device upgrade method according to an embodiment of this application. The method may be implemented based on the vehicle-mounted device upgrade system shown in FIG. 1. The method includes but is not limited to the following steps.

Step S301: A first vehicle-mounted device configures a first key.

Step S302: A second vehicle-mounted device configures the first key.

Further, the first key is a PSK pre-configured for the first vehicle-mounted device and the second vehicle-mounted device. The first key may be a key that is manually set in the first vehicle-mounted device and the second vehicle-mounted device, or may be a key that is generated by a third-party device and that is sent to the first vehicle-mounted device and the second vehicle-mounted device. The third-party device may communicate with the first vehicle-mounted device and the second vehicle-mounted device by using a wired link or a wireless link.

Step S303: The first vehicle-mounted device uses the first data segment as an input of a first algorithm, to obtain an output check value corresponding to the first data segment.

Further, the first algorithm is a hash algorithm, and the check value is a hash value obtained by the first vehicle-mounted device according to the first algorithm. The first vehicle-mounted device may use, as the input of the first algorithm, the first data segment in a plurality of data segments (for example, n data segments) included in an upgrade file used to upgrade the second vehicle-mounted device, to obtain the output hash value, namely, a first check value.

For example, if the first data segment is data 1, and the first algorithm is an MD5 algorithm, the first vehicle-mounted device obtains, by using the first data segment as the input of the first algorithm, the output check value corresponding to the first data segment, where the check value is that check 1=MD5 (data 1).

Step S304: The first vehicle-mounted device encrypts, by using the first key, the first data segment and the check value corresponding to the first data segment, to obtain an encrypted segment corresponding to the first data segment.

Step S305: The first vehicle-mounted device sends, to the second vehicle-mounted device, the encrypted segment corresponding to the first data segment.

Step S306: The second vehicle-mounted device receives the encrypted segment corresponding to the first data segment.

Step S307: The second vehicle-mounted device decrypts, by using the first key, the encrypted segment corresponding to the first data segment, to obtain the first data segment and the check value corresponding to the first data segment.

Step S308: The second vehicle-mounted device stores the first data segment in the second vehicle-mounted device when successfully verifying, according to the first algorithm, the check value corresponding to the first data segment.

Further, the second vehicle-mounted device uses the first data segment obtained through decryption as the input of the first algorithm to obtain the output hash value, and compares the hash value with the check value corresponding to the first data segment obtained through decryption. If the hash value is the same as the check value corresponding to the first data segment obtained through decryption, the second vehicle-mounted device considers that the first data segment is not tampered (in other words, the integrity verification succeeds), and stores the first data segment in an address unit corresponding to a flash of the second vehicle-mounted device. If the hash value and the check value corresponding to the first data segment obtained through decryption are different, the second vehicle-mounted device considers that the first data segment is tampered (in other words, the integrity verification fails), stops write the upgrade file, and reports an alarm indicating that the first data segment is abnormal to a vehicle-mounted device, such as a VCU, that is in the vehicle and that is configured to implement fault diagnosis and protection for a vehicle system.

For example, if the first algorithm is the MD5 algorithm, the first data segment obtained through decryption is the data 1, and the check value corresponding to the first data segment obtained through decryption is the check 1, the second vehicle-mounted device uses the first data segment obtained through decryption as the input of the first algorithm to obtain an output hash value hash 1=MD5 (data 1), and compares the hash 1 with the check 1. If the hash 1 and the check 1 are the same, the integrity verification succeeds. If the hash 1 and the check 1 are different, the integrity verification fails.

Step S309: The first vehicle-mounted device uses a second data segment and the check value corresponding to the first data segment as inputs of the first algorithm, to obtain an output check value corresponding to the second data segment.

Further, the check value corresponding to the first data segment is a hash value obtained by processing the first data segment according to the first algorithm, and the check value corresponding to the first data segment is sent by the first vehicle-mounted device to the second vehicle-mounted device in a process of transmitting the first data segment. The first vehicle-mounted device may use the second data segment and the check value corresponding to the first data segment as the inputs of the first algorithm to obtain the check value corresponding to the second data segment.

For example, if the first algorithm is the MD5 algorithm, the first data segment is the data 1, the check value corresponding to the first data segment is that check 1=MD5 (data 1), and the second data segment is data 2, the first vehicle-mounted device uses the second data segment and the check value corresponding to the first data segment as the inputs of the first algorithm, to obtain a check value corresponding to the second data segment, where the check value is that check 2=MD5 (data 2, check 1).

Step S310: The first vehicle-mounted device encrypts, by using the first key, the second data segment and the check value corresponding to the second data segment, to obtain a second encrypted segment.

Step S311: The first vehicle-mounted device sends the second encrypted segment to the second vehicle-mounted device.

Step S312: The second vehicle-mounted device receives the second encrypted segment.

Step S313: The second vehicle-mounted device decrypts the second encrypted segment by using the first key, to obtain the second data segment and the check value corresponding to the second data segment.

Step S314: The second vehicle-mounted device stores the second data segment in the second vehicle-mounted device when successfully verifying, according to the first algorithm, the check value corresponding to the second data segment.

Further, the second vehicle-mounted device uses, as inputs of the first algorithm, the second data segment obtained through decryption and the check value that corresponds to the first data segment and that is obtained through decryption in the process of transmitting the first data segment, to obtain an output hash value, and compares the hash value with the check value that corresponds to the second data segment and that is obtained through decryption. If the hash value is the same as the check value that corresponds to the second data segment and that is obtained through decryption, and the integrity verification succeeds, the second vehicle-mounted device stores the second data segment obtained through decryption in the address unit corresponding to the flash of the second vehicle-mounted device. If the hash value and the check value that corresponds to the second data segment and that is obtained through decryption are different, and the integrity verification fails, the second vehicle-mounted device stops write the upgrade file and reports an alarm indicating that the second data segment is abnormal to the vehicle-mounted device, for example, the VCU, that is in the vehicle and that is used to implement fault diagnosis and protection for the vehicle system.

Next, the second vehicle-mounted device continuously writes n−2 data segments into the upgrade file other than the first data segment and the second data segment into the second vehicle-mounted device in the manner of the steps S309 to S314. After writing all the n data segments into the second vehicle-mounted device, the second vehicle-mounted device may assemble the n data segments to obtain the upgrade file, and upgrade the system based on the upgrade file.

For example, n is 3, in other words, the upgrade file includes three data segments which are data 1, data 2, and data 3 in sequence, the first algorithm is the MD5 algorithm, the first data segment is the data 1, the second data segment is the data 2, the check value corresponding to the first data segment is the check 1, and the check value corresponding to the second data segment is the check 2. A transmission process of the data 1 and the data 2 is already shown in FIG. 3A and FIG. 3B, and details are not described herein again. A third data segment is the data 3, and the first vehicle-mounted device uses the third data segment and the check value corresponding to the second data segment as inputs of the first algorithm, to obtain an output check value corresponding to the third data segment, where the check value is that check 3=MD5 (data 3, check 2), encrypts the data 3 and the check 3 by using the first key to obtain a third encrypted segment, and sends the third encrypted segment to the second vehicle-mounted device. Correspondingly, the second vehicle-mounted device receives and decrypts the third encrypted segment by using the first key, to obtain the third data segment data 3 and the check value check 3 corresponding to the third data segment, then calculates, according to the first algorithm, a hash value that corresponds to the third data segment obtained through decryption, where the hash value is that a hash 3=MD5 (data 3, check 2), and compares the hash 3 and the check 3. If the hash 3 and the check 3 are the same, the integrity verification succeeds. If the hash 3 and the check 3 are different, the integrity verification fails. When all the three data segments are written into the second vehicle-mounted device, the second vehicle-mounted device may assemble the data 1, the data 2, and the data 3 in a receiving sequence to obtain the upgrade file, and upgrade a system based on the upgrade file.

In the foregoing method, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file. In addition, confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

Figure 4A:
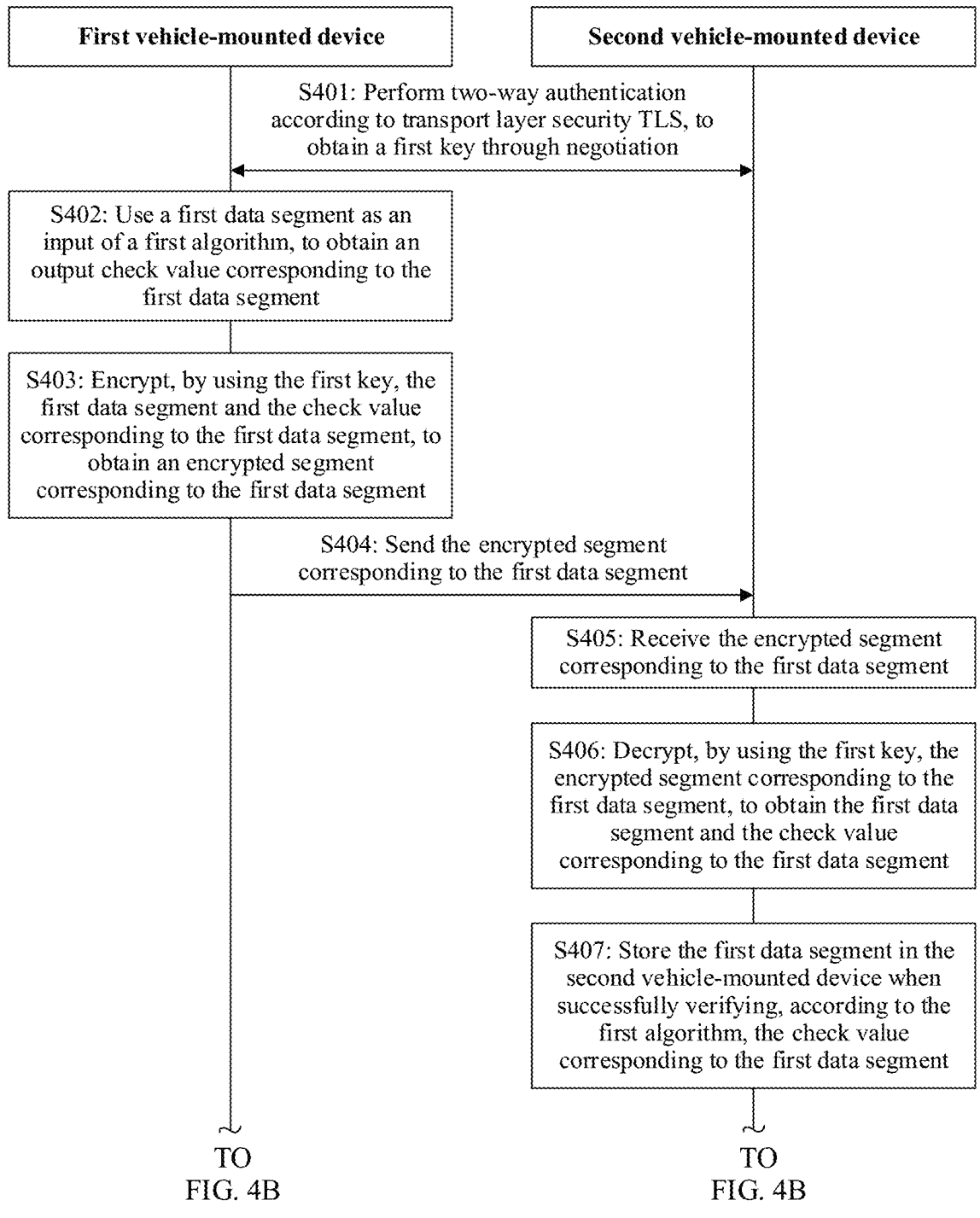
FIG. 4A and FIG. 4B are a schematic flowchart of another vehicle-mounted device upgrade method according to an embodiment of this application.
Figure 4B:
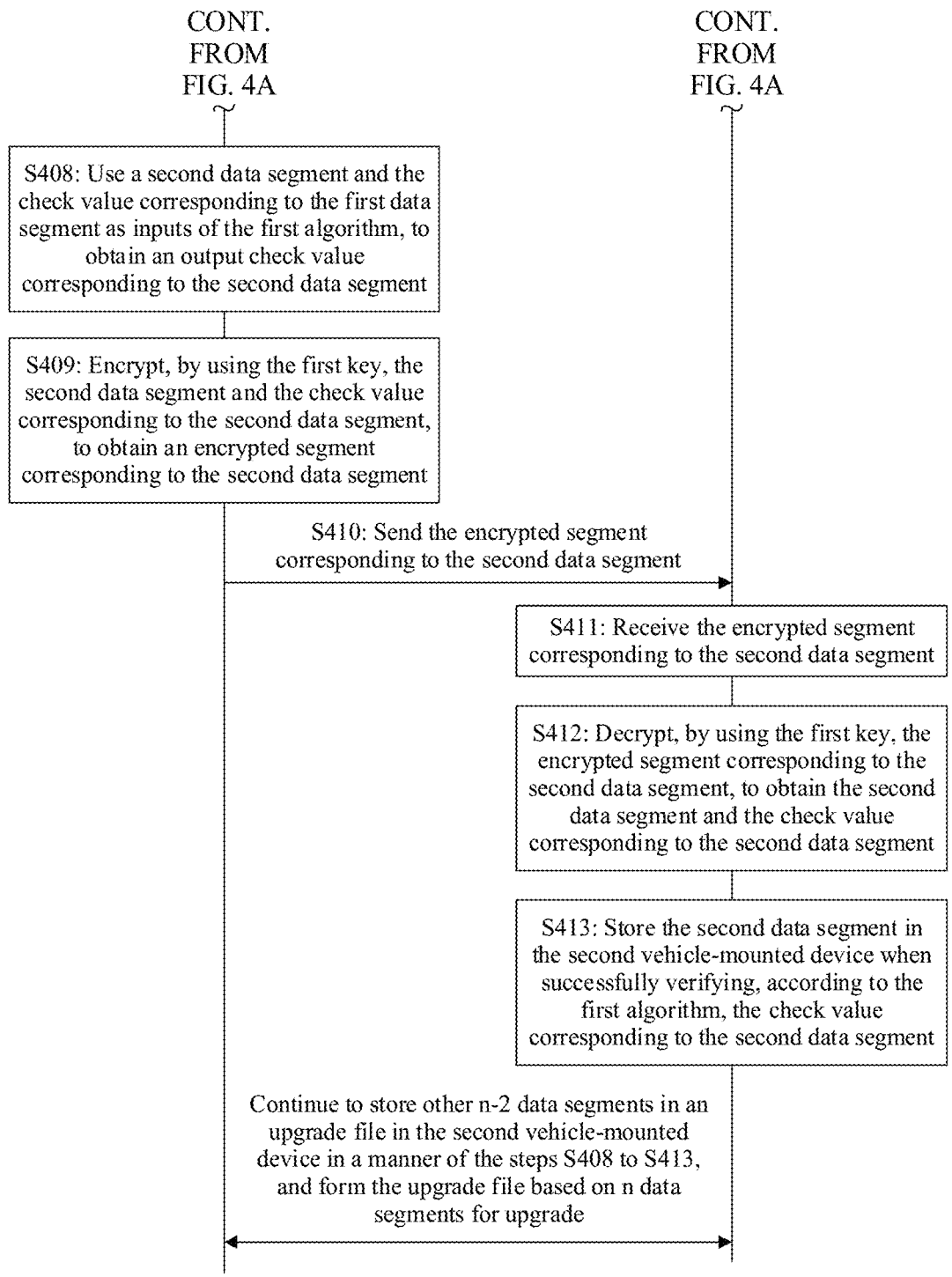

FIG. 4A and FIG. 4B are a schematic flowchart of another vehicle-mounted device upgrade method according to an embodiment of this application. The method may be implemented based on the vehicle-mounted device upgrade system shown in FIG. 1. The method includes but is not limited to the following steps.

Step S401: Two-way authentication is performed between a first vehicle-mounted device and a second vehicle-mounted device according to a TLS protocol, to obtain a first key through negotiation.

Further, the first key is a key obtained through TLS protocol negotiation between the first vehicle-mounted device and the second vehicle-mounted device. A principle of the two-way authentication according to the TLS protocol is the same as that of the two-way authentication according to the HTTPS described in FIG. 2A and FIG. 2B. The first vehicle-mounted device and the second vehicle-mounted device may implement two-way identity authentication by using respective device certificates or a preset key, to prevent an attacker from forging the first vehicle-mounted device to deliver a malicious upgrade file, and forging the second vehicle-mounted device to steal important information included in the upgrade file. When the two-way authentication is performed according to the TLS protocol, the first vehicle-mounted device and the second vehicle-mounted device may negotiate a parameter used for transmission, such as a type of a first algorithm, and the first key used for encryption and decryption.

Step S402: The first vehicle-mounted device uses the first data segment as an input of the first algorithm, to obtain an output check value corresponding to the first data segment.

Step S403: The first vehicle-mounted device encrypts, by using the first key, the first data segment and the check value corresponding to the first data segment, to obtain an encrypted segment corresponding to the first data segment.

Step S404: The first vehicle-mounted device sends, to the second vehicle-mounted device, the encrypted segment corresponding to the first data segment.

Step S405: The second vehicle-mounted device receives the encrypted segment corresponding to the first data segment.

Step S406: The second vehicle-mounted device decrypts, by using the first key, the encrypted segment corresponding to the first data segment, to obtain the first data segment and the check value corresponding to the first data segment.

Step S407: The second vehicle-mounted device stores the first data segment in the second vehicle-mounted device when successfully verifying, according to the first algorithm, the check value corresponding to the first data segment.

Step S408: The first vehicle-mounted device uses a second data segment and the check value corresponding to the first data segment as inputs of the first algorithm, to obtain an output check value corresponding to the second data segment.

Step S409: The first vehicle-mounted device encrypts, by using the first key, the second data segment and the check value corresponding to the second data segment, to obtain a second encrypted segment.

Step S410: The first vehicle-mounted device sends the second encrypted segment to the second vehicle-mounted device.

Step S411: The second vehicle-mounted device receives the second encrypted segment.

Step S412: The second vehicle-mounted device decrypts the second encrypted segment by using the first key, to obtain the second data segment and the check value corresponding to the second data segment.

Step S413: The second vehicle-mounted device stores the second data segment in the second vehicle-mounted device when successfully verifying, according to the first algorithm, the check value corresponding to the second data segment.

Further, a process of writing the upgrade file by segment in the steps S402 to S413 is consistent with the process of writing the upgrade file by segment in the steps S303 to S314 in FIG. 3A and FIG. 3B. Details are not described herein again.

In the foregoing method, encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

Figure 5:
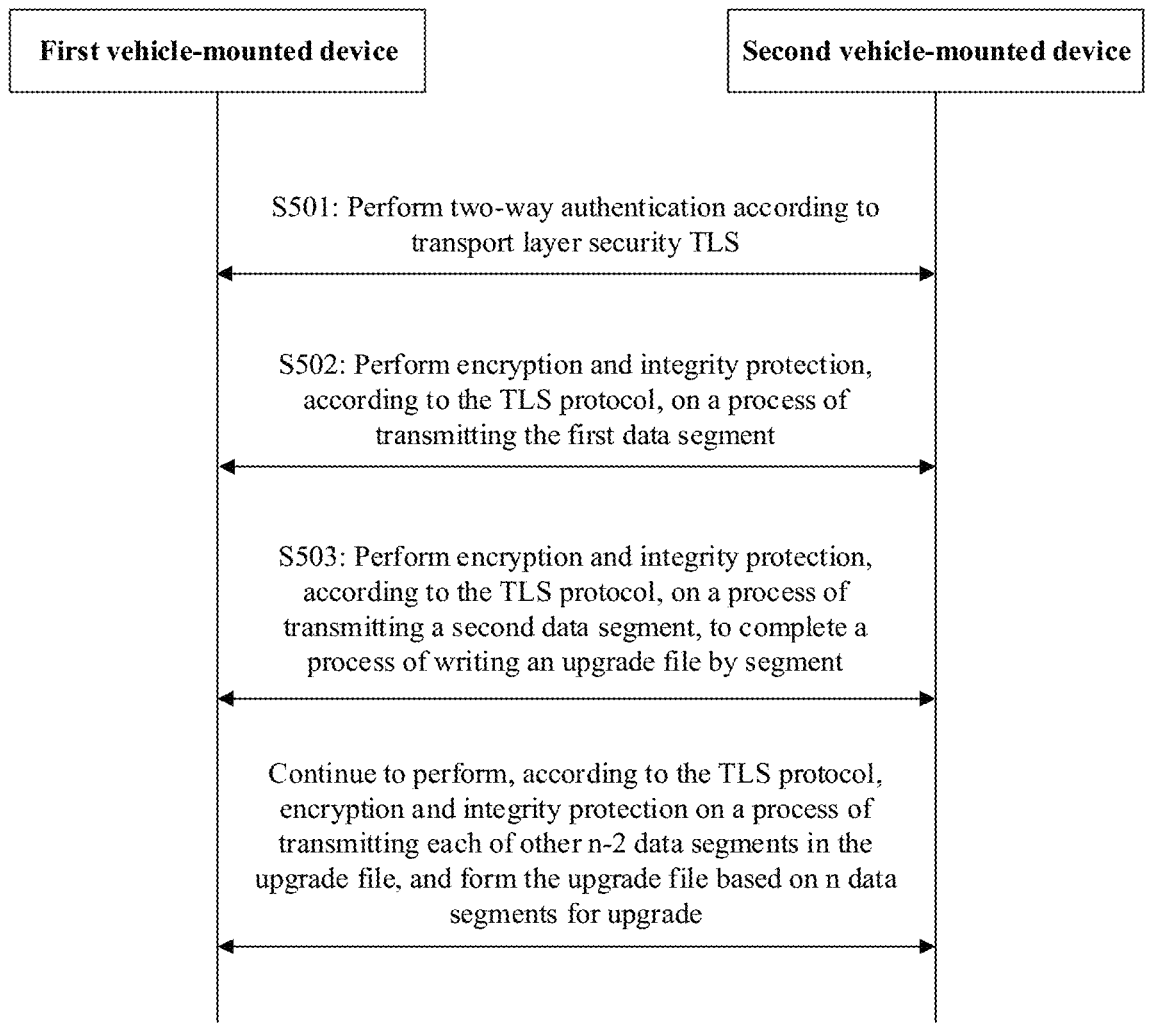
FIG. 5 is a schematic flowchart of another vehicle-mounted device upgrade method according to an embodiment of this application.

FIG. 5 is a schematic flowchart of another vehicle-mounted device upgrade method according to an embodiment of this application. The method may be implemented by using the vehicle-mounted device upgrade system shown in FIG. 1. According to the method, a TLS protocol in a Request for Comments (RFC) 5246 standard may be applied to a process of writing an upgrade file by segment. The method includes but is not limited to the following steps.

Step S501: Two-way authentication is performed between a first vehicle-mounted device and a second vehicle-mounted device according to a TLS protocol.

Further, the TLS protocol in the RFC 5246 standard includes a handshake phase and a transmission phase. In the handshake phase (namely, the two-way authentication according to the TLS protocol), the two-way authentication is performed between the first vehicle-mounted device and the second vehicle-mounted device according to the TLS protocol, to implement identity authentication, and an integrity protection algorithm (namely, a first algorithm) used in a subsequent transmission phase and a first key used to ensure confidentiality of an upgrade file are negotiated. In the transmission phase, the first vehicle-mounted device and the second vehicle-mounted device protect confidentiality and integrity of a process of transmitting each data segment according to the TLS protocol, to ensure security of a process of upgrading the vehicle-mounted device.

Step S502: The first vehicle-mounted device and the second vehicle-mounted device perform encryption and integrity protection, according to the TLS protocol, on a process of transmitting the first data segment.

Further, the upgrade file used to upgrade the second vehicle-mounted device includes the plurality of data segments. The first vehicle-mounted device and the second vehicle-mounted device may protect, according to the TLS protocol in the RFC 5246 standard, confidentiality and integrity of the first data segment in the plurality of data segments (for example, n data segments) included in the upgrade file used to upgrade the second vehicle-mounted device.

Further, the first vehicle-mounted device encrypts the first data segment by using the negotiated first key, to obtain an encrypted segment corresponding to the first data segment, calculates, according to the negotiated first algorithm, a MAC corresponding to the first data segment, namely, a check value corresponding to the first data segment, and send, to the second vehicle-mounted device, the encrypted segment corresponding to the first data segment and the MAC corresponding to the first data segment.

Correspondingly, the second vehicle-mounted device receives the encrypted segment corresponding to the first data segment and the MAC corresponding to the first data segment, decrypts, by using the negotiated first key, the encrypted segment corresponding to the first data segment, to obtain the first data segment, calculates, according to the negotiated first algorithm, a MAC corresponding to the first data segment obtained through decryption, and then, compares the MAC obtained by the second vehicle-mounted device through calculation with the received MAC corresponding to the first data segment. If the MAC obtained by the second vehicle-mounted device through calculation with the received MAC corresponding to the first data segment are the same, the second vehicle-mounted device considers that the first data segment is not tampered (in other words, the integrity verification succeeds), and stores the first data segment obtained through decryption in an address unit corresponding to a flash of the second vehicle-mounted device. If the MAC obtained by the second vehicle-mounted device through calculation with the received MAC corresponding to the first data segment are different, the second vehicle-mounted device considers that the first data segment is tampered (in other words, the integrity verification fails), stops write the upgrade file, and reports an alarm indicating that the first data segment is abnormal to a vehicle-mounted device, such as a VCU, that is in the vehicle and that is configured to implement fault diagnosis and protection for a vehicle system.

For example, if the first data segment is data 1, and the first algorithm is an HMAC algorithm, the first vehicle-mounted device obtains, through calculation according to the first algorithm, a MAC value corresponding to the first data segment data 1, where the MAC is that check 1=HMAC (data 1). Correspondingly, the second vehicle-mounted device calculates, according to the first algorithm, a MAC value corresponding to the first data segment data 1 obtained through decryption, where the MAC is that mac 1=HMAC (data 1), and then compares the check 1 with the mac 1. If the check 1 and the mac 1 are the same, the integrity verification succeeds. If the check 1 and the mac 1 are different, the integrity verification fails.

Step S503: The first vehicle-mounted device and the second vehicle-mounted device perform encryption and integrity protection, according to the TLS protocol, on a process of transmitting the second data segment.

Further, encryption and integrity protection continue to be performed, according to the TLS protocol, on a process of transmitting each data segment other than the first data segment in the n data segments of the upgrade file, in other words, each data segment other than the first data segment in the n data segments of the upgrade file is written into the second vehicle-mounted device in the manner of the step S502. After the n data segments are all written into the second vehicle-mounted device, the second vehicle-mounted device may assemble the n data segments to obtain the upgrade file, and upgrade the system based on the upgrade file.

In the foregoing method, confidentiality and integrity of each data segment are protected according to the TLS protocol in the RFC 5246 standard, to ensure security of an upgrade file transmission process.

In this embodiment of this application, each data segment in the plurality of data segments in the upgrade file used to upgrade the second vehicle-mounted device is separately encrypted and transmitted, to ensure confidentiality of an in-vehicle transmission process. The first vehicle-mounted device and the second vehicle-mounted device protect integrity of each data segment by using a hash chain or the integrity protection algorithm commonly used in the TLS protocol, so that the first vehicle-mounted device and the second vehicle-mounted device can detect an abnormal data segment in time, and after detecting the abnormal data segment, timely trigger a stop of transmitting a new data segment, to avoid a case in which the second vehicle-mounted device works abnormally or resources are wasted because the abnormal data is written into the second vehicle-mounted device by segment.

In addition, the download server that provides the upgrade file is a server that performs two-way authentication with the first vehicle-mounted device according to the HTTPS protocol, to ensure validity of an upgrade package source. The download server and the first vehicle-mounted device transmit an encrypted upgrade file, to ensure confidentiality of an off-vehicle transmission process. The first vehicle-mounted device stores the encrypted upgrade file, to ensure confidentiality of the upgrade file during storage.

The foregoing describes in detail the methods in the embodiments of this application. The following provides apparatuses in the embodiments of this application.

Figure 6:
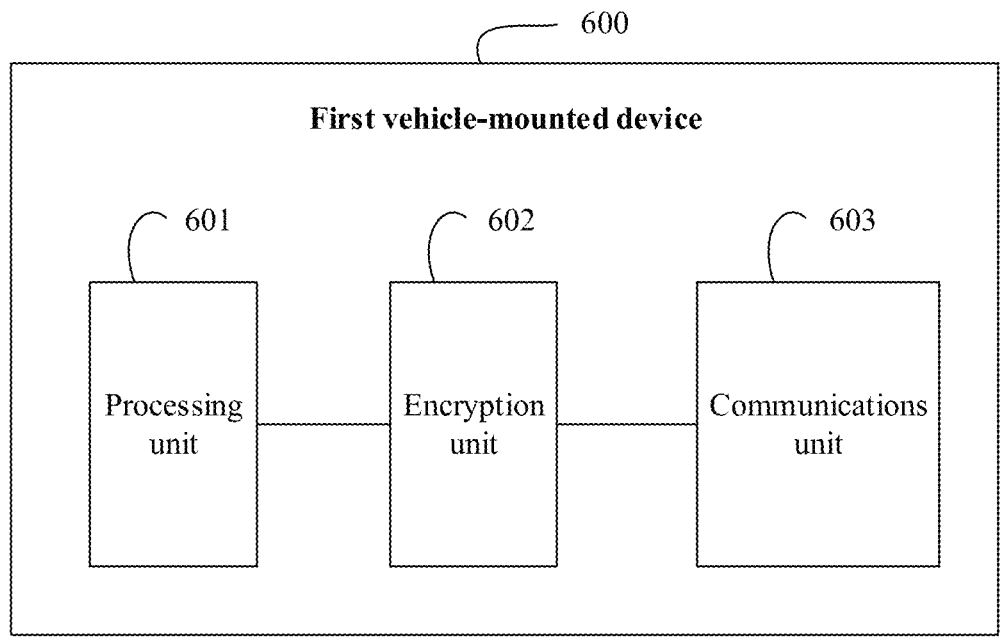
FIG. 6 is a schematic structural diagram of a first device according to an embodiment of this application.

FIG. 6 is a schematic structural diagram of a first vehicle-mounted device according to an embodiment of this application. The first vehicle-mounted device 600 may include a processing unit 601, an encryption unit 602, and a communications unit 603. Detailed descriptions of the units are as follows.

The processing unit 601 is configured to process a first data segment according to a first algorithm, to obtain a first check value. The first data segment is any data segment in a plurality of data segments included in an upgrade file used to upgrade a second vehicle-mounted device. The first check value is sent to the second vehicle-mounted device.

The encryption unit 602 is configured to encrypt the first data segment by using a first key, to obtain a first encrypted segment.

The communications unit 603 is configured to send the first encrypted segment to the second vehicle-mounted device, so that when successfully verifying the first check value according to the first algorithm, the second vehicle-mounted device stores, in the second vehicle-mounted device, the first data segment obtained by decrypting the first encrypted segment by using the first key. The first data segment is used by the second vehicle-mounted device to form the upgrade file for upgrade.

It can be learned that each data segment in the plurality of data segments in the upgrade file used to upgrade the second vehicle-mounted device is separately encrypted and transmitted, to effectively reduce a risk of stealing each data segment in an in-vehicle transmission process, and ensure confidentiality of each data segment in the in-vehicle transmission process. In addition, a receive end (namely, the second vehicle-mounted device) needs to verify a check value corresponding to each data segment, instead of verifying the entire upgrade file only after transmission of a last data segment is completed, so that the receive end can detect a tampered abnormal data segment in time, and after detecting the abnormal data segment, can timely trigger a stop of transmitting a new data segment, to avoid a case in which the second vehicle-mounted device works abnormally or resources are wasted because the abnormal data segment is written into the second vehicle-mounted device, to ensure integrity of each data segment, and to effectively improve security of the upgrade file transmission process.

In an optional solution, the first vehicle-mounted device 600 further includes a negotiation unit and a decryption unit.

The negotiation unit is configured to, before the processing unit 601 processes the first data segment according to the first algorithm to obtain the first check value, perform two-way authentication with a download server through HTTPS negotiation. The download server is configured to provide the upgrade file for the second vehicle-mounted device.

The communications unit 603 is further configured to receive an encrypted file sent by the download server. The encrypted file is obtained by encrypting the upgrade file.

The decryption unit is configured to decrypt the encrypted file when a preset upgrade condition is met, to obtain the upgrade file.

It can be learned that the download server that provides the upgrade file is a server that performs two-way authentication with the first vehicle-mounted device according to the HTTPS protocol, so that a source of the upgrade file is valid, an unauthorized platform is prevented from delivering a malicious upgrade file to the first vehicle-mounted device, and an attacker is prevented from forging the first vehicle-mounted device to steal the upgrade file that is released by the download server and that includes important information. In addition, the encrypted upgrade file is transmitted between the download server and the first vehicle-mounted device, and the first vehicle-mounted device stores the encrypted upgrade file, so that a risk of stealing the upgrade file can be effectively reduced, confidentiality of the upgrade file in an off-vehicle transmission process and during storage can be ensured, and security of the upgrade file transmission process is effectively improved.

In another optional solution, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

It can be learned that, in the plurality of data segments in the upgrade file, a check value corresponding to the data segment other than the first data segment is related to a check value corresponding to a previous data segment. A sequence detection mechanism for data segments is implemented by using a hash chain, to avoid an error occurs during upgrade file assembly because out-of-order segments are successfully written, and to increase, by using the verification values with the hash chain, a difficulty of maliciously cracking the upgrade file.

In another optional solution, the first encrypted segment is obtained by encrypting the first data segment and the first check value by using the first key.

It can be learned that the first check value may be further encrypted while the first data segment is encrypted. This further improves security of the upgrade file transmission process.

In another optional solution, the first key is a pre-shared key pre-configured for the first vehicle-mounted device and the second vehicle-mounted device.

It can be learned that confidentiality of each data segment is ensured by using the pre-shared key that is pre-configured instead of a key obtained according to a security protocol or a security algorithm negotiation, so that resource consumption of the first vehicle-mounted device and the second vehicle-mounted device can be effectively reduced.

In another optional solution, the first key is a key obtained by performing two-way authentication negotiation between the first vehicle-mounted device and the second vehicle-mounted device according to a TLS protocol.

It can be learned that encrypting each data segment by using the key obtained through the TLS protocol negotiation can ensure confidentiality of each data segment. In addition, for different second vehicle-mounted devices, there are different two-way authentication processes performed between the first vehicle-mounted device and the second vehicle-mounted device, and different first keys obtained through negotiation, in other words, different upgrade files may correspond to different encryption keys and decryption keys, to greatly improve security of an upgrade file transmission process.

In another optional solution, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It can be learned that confidentiality and integrity of each data segment are protected according to the TLS protocol, to ensure security of an upgrade file transmission process.

It should be noted that, for implementation of each operation, refer to corresponding descriptions of the method embodiments shown in FIG. 2A, FIG. 2B, FIG. 3A, FIG. 3B, FIG. 4A, FIG. 4B, and FIG. 5. The first vehicle-mounted device 600 is the first vehicle-mounted device in the method embodiments shown in FIG. 2A, FIG. 2B, FIG. 3A, FIG. 3B, FIG. 4A, FIG. 4B, and FIG. 5.

Figure 7:
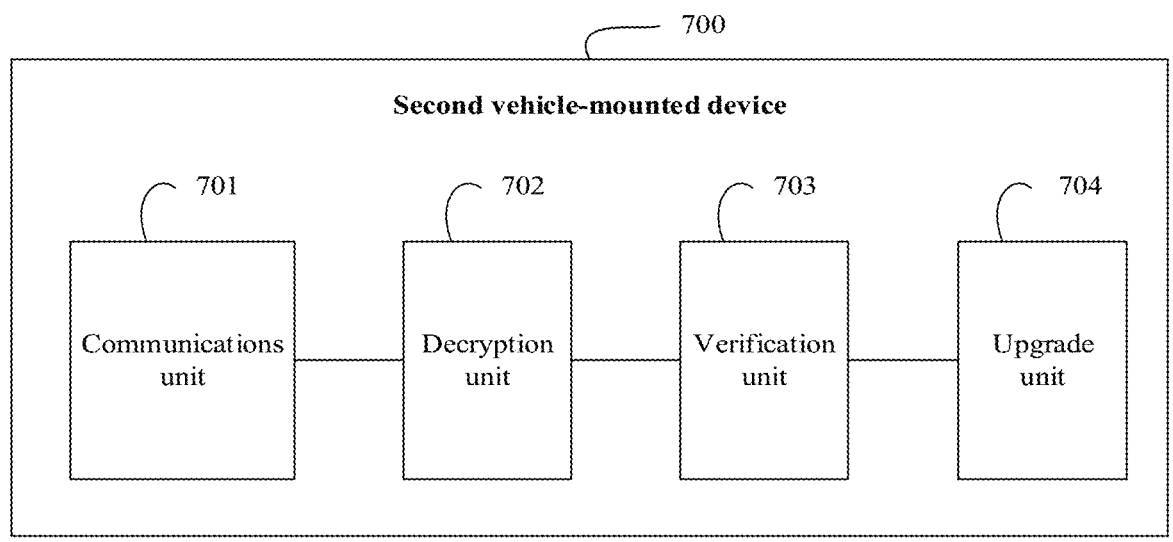
FIG. 7 is a schematic structural diagram of a second device according to an embodiment of this application.

FIG. 7 is a schematic structural diagram of a second vehicle-mounted device according to an embodiment of this application. The second vehicle-mounted device 700 may include a communications unit 701, a decryption unit 702, a verification unit 703, and an upgrade unit 704. Detailed descriptions of the units are as follows.

The communications unit 701 is configured to receive a first encrypted segment sent by a first vehicle-mounted device, where the first encrypted segment is obtained by encrypting a first data segment by using a first key, and the first data segment is any data segment in a plurality of data segments included in an upgrade file used to upgrade the second vehicle-mounted device.

The decryption unit 702 is configured to decrypt the first encrypted segment by using the first key, to obtain the first data segment.

The verification unit 703 is configured to, when successfully verifying a first check value according to the first algorithm, store the first data segment in the second vehicle-mounted device, where the first check value is obtained by the first vehicle-mounted device by processing the first data segment according to the first algorithm, and the first check value is received by the second vehicle-mounted device from the first vehicle-mounted device.

The upgrade unit 704 is configured to form the upgrade file based on the first data segment for upgrade.

In an optional solution, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

In another optional solution, the first encrypted segment is obtained by encrypting the first data segment and the first check value by using the first key.

In another optional solution, the first key is a pre-shared key pre-configured for the first vehicle-mounted device and the second vehicle-mounted device.

In another optional solution, the first key is a key obtained by performing two-way authentication negotiation between the first vehicle-mounted device and the second vehicle-mounted device according to a TLS protocol.

In another optional solution, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It should be noted that, for implementation of each operation, refer to corresponding descriptions of the method embodiments shown in FIG. 2A, FIG. 2B, FIG. 3A, FIG. 3B, FIG. 4A, FIG. 4B, and FIG. 5. The second vehicle-mounted device 700 is the second vehicle-mounted device in the method embodiments shown in FIG. 2A, FIG. 2B, FIG. 3A, FIG. 3B, FIG. 4A, FIG. 4B, and FIG. 5.

Figure 8:
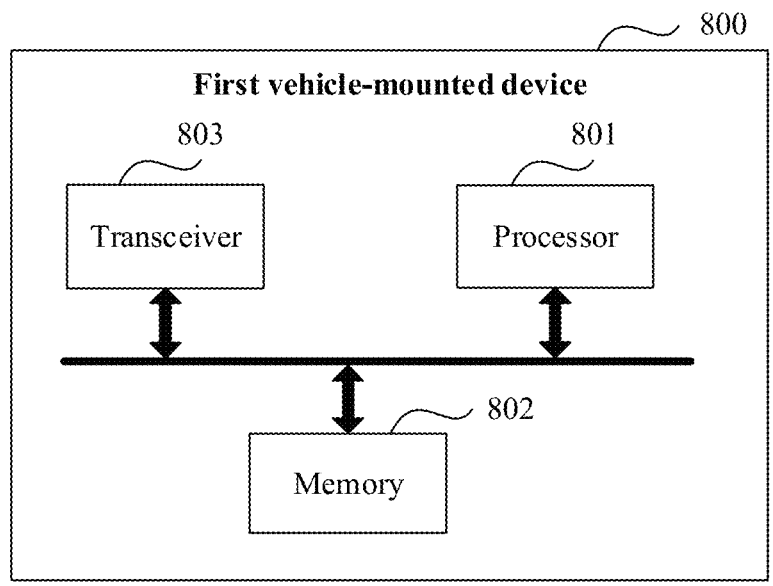
FIG. 8 is a schematic structural diagram of another first device according to an embodiment of this application.

FIG. 8 is a schematic structural diagram of still another first vehicle-mounted device according to an embodiment of this application. The first vehicle-mounted device 800 may include a processor 801, a memory 802, and a transceiver 803. The processor 801, the memory 802, and the transceiver 803 are connected to each other by using a bus.

The memory 802 includes but is not limited to a random-access memory (RAM), a read-only memory (ROM), an erasable programmable ROM (EPROM), or a compact disc (CD) ROM (CD-ROM). The memory 802 is configured to store a related computer program and data. The transceiver 803 is configured to receive and send data.

The processor 801 may be one or more central processing units (CPUs). When the processor 801 includes one CPU, the CPU may be a single-core CPU, or may be a multi-core CPU.

The processor 801 in the first vehicle-mounted device 800 may be configured to read computer program code stored in the memory 802, to perform the following operations processing a first data segment according to a first algorithm, to obtain a first check value, where the first data segment is any data segment in a plurality of data segments included in an upgrade file used to upgrade a second vehicle-mounted device, and the first check value is sent to the second vehicle-mounted device, encrypting the first data segment by using a first key, to obtain a first encrypted segment, and controlling the transceiver 803 to send the first encrypted segment to the second vehicle-mounted device, so that when successfully verifying the first check value according to the first algorithm, the second vehicle-mounted device stores, in the second vehicle-mounted device, the first data segment obtained by decrypting the first encrypted segment by using the first key, where the first data segment is used by the second vehicle-mounted device to form the upgrade file for upgrade.

In an optional solution, before the processing a first data segment according to a first algorithm, to obtain a first check value, the processor 801 is further configured to perform two-way authentication with a download server according to an HTTPS protocol, where the download server is configured to provide the upgrade file for the second vehicle-mounted device, control the transceiver 803 to receive an encrypted file sent by the download server, where the encrypted file is obtained by encrypting the upgrade file, and decrypt the encrypted file when a preset upgrade condition is met, to obtain the upgrade file.

In another optional solution, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

In another optional solution, the first encrypted segment is obtained by encrypting the first data segment and the first check value by using the first key.

In another optional solution, the first key is a pre-shared key pre-configured for the first vehicle-mounted device and the second vehicle-mounted device.

In another optional solution, the first key is a key obtained by performing two-way authentication negotiation between the first vehicle-mounted device and the second vehicle-mounted device according to a TLS protocol.

In another optional solution, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It should be noted that, for implementation of each operation, refer to corresponding descriptions of the method embodiments shown in FIG. 2A, FIG. 2B, FIG. 3A, FIG. 3B, FIG. 4A, FIG. 4B, and FIG. 5. The first vehicle-mounted device 800 is the first vehicle-mounted device in the method embodiments shown in FIG. 2A, FIG. 2B, FIG. 3A, FIG. 3B, FIG. 4A, FIG. 4B, and FIG. 5.

Figure 9:
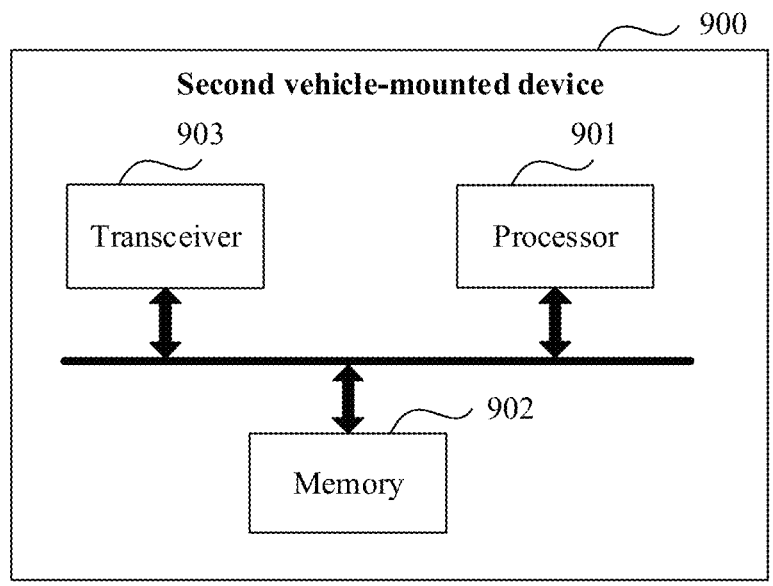
FIG. 9 is a schematic structural diagram of another second device according to an embodiment of this application.

FIG. 9 is a schematic structural diagram of still another second vehicle-mounted device according to an embodiment of this application. The second vehicle-mounted device 900 may include a processor 901, a memory 902, and a transceiver 903. The processor 901, the memory 902, and the transceiver 903 are connected to each other by using a bus.

The memory 902 includes but is not limited to a RAM, a ROM, an EPROM, or a CD-ROM. The memory 902 is configured to store a related computer program and data. The transceiver 903 is configured to receive and send data.

The processor 901 may be one or more CPUs. When the processor 901 is one CPU, the CPU may be a single-core CPU, or may be a multi-core CPU.

The processor 901 in the second vehicle-mounted device 900 may be configured to read computer program code stored in the memory 902, to perform the following operations controlling the transceiver 903 to receive a first encrypted segment sent by a first vehicle-mounted device, where the first encrypted segment is obtained by encrypting a first data segment by using a first key, and the first data segment is any data segment in a plurality of data segments included in an upgrade file used to upgrade the second vehicle-mounted device, decrypting the first encrypted segment by using the first key, to obtain the first data segment, when successfully verifying a first check value according to the first algorithm, storing the first data segment in the second vehicle-mounted device, where the first check value is obtained by the first vehicle-mounted device by processing the first data segment according to the first algorithm, and the first check value is received by the second vehicle-mounted device from the first vehicle-mounted device, and forming the upgrade file based on the first data segment for upgrade.

In an optional solution, if the first data segment is the first data segment in the plurality of data segments in the upgrade file, the first check value is output data obtained by using the first data segment as an input of the first algorithm.

Alternatively, if the first data segment is a data segment other than the first data segment in the plurality of data segments in the upgrade file, the first check value is output data obtained by using the first data segment and a second check value as inputs of the first algorithm, where the second check value is obtained by processing a previous data segment of the first data segment according to the first algorithm.

In another optional solution, the first encrypted segment is obtained by encrypting the first data segment and the first check value by using the first key.

In another optional solution, the first key is a pre-shared key pre-configured for the first vehicle-mounted device and the second vehicle-mounted device.

In another optional solution, the first key is a key obtained by performing two-way authentication negotiation between the first vehicle-mounted device and the second vehicle-mounted device according to a TLS protocol.

In another optional solution, the first key is a key obtained by performing two-way authentication negotiation between the first vehicle-mounted device and the second vehicle-mounted device according to a TLS protocol.

The first check value is message authentication code that is of the first data segment and that is obtained by processing the first data segment according to the TLS protocol and the first algorithm.

It should be noted that, for implementation of each operation, refer to corresponding descriptions of the method embodiments shown in FIG. 2A, FIG. 2B, FIG. 3A, FIG. 3B, FIG. 4A, FIG. 4B, and FIG. 5. The second vehicle-mounted device 900 is the second vehicle-mounted device in the method embodiments shown in FIG. 2A, FIG. 2B, FIG. 3A, FIG. 3B, FIG. 4A, FIG. 4B, and FIG. 5.

An embodiment of this application further provides a chip system. The chip system includes at least one processor, a memory, and an interface circuit. The memory, the transceiver, and the at least one processor are interconnected by using a line, and the at least one memory stores a computer program. When the computer program is executed by the processor, the operations performed by the first vehicle-mounted device in the embodiment shown in FIG. 2A, FIG. 2B, FIG. 3A, FIG. 3B, FIG. 4A, FIG. 4B, or FIG. 5 are implemented, or the operations performed by the second vehicle-mounted device in the embodiment shown in FIG. 2A, FIG. 2B, FIG. 3A, FIG. 3B, FIG. 4A, FIG. 4B, or FIG. 5 are implemented.

An embodiment of this application further provides a computer-readable storage medium. The computer-readable storage medium stores a computer program. When the computer program runs on a processor, the operations performed by the first vehicle-mounted device in the embodiment shown in FIG. 2A, FIG. 2B, FIG. 3A, FIG. 3B, FIG. 4A, FIG. 4B, or FIG. 5 are implemented, or the operations performed by the second vehicle-mounted device in the embodiment shown in the embodiment shown in FIG. 2A, FIG. 2B, FIG. 3A, FIG. 3B, FIG. 4A, FIG. 4B, or FIG. 5 are implemented.

An embodiment of this application further provides a computer program product. When the computer program product runs on a processor, the operations performed by the first vehicle-mounted device in the embodiment shown in FIG. 2A, FIG. 2B, FIG. 3A, FIG. 3B, FIG. 4A, FIG. 4B, or FIG. 5 are implemented, or the operations performed by the second vehicle-mounted device in the embodiment shown in FIG. 2A, FIG. 2B, FIG. 3A, FIG. 3B, FIG. 4A, FIG. 4B, or FIG. 5 are implemented.

A person of ordinary skill in the art may understand that all or some of the processes of the methods in the embodiments may be implemented by a computer program instructing relevant hardware. The computer program may be stored in a computer readable storage medium. When the computer program runs, the processes of the methods in the embodiments are performed. The foregoing storage medium includes any medium that can store computer program code, such as a ROM or a RAM, a magnetic disk or an optical disc.

What is claimed is:

1. A method implemented by a vehicle, wherein the method comprises:
processing, by a first vehicle-mounted device of the vehicle and according to a first algorithm, a first data segment to obtain a first check value, wherein the first data segment is in a plurality of data segments comprised in an upgrade file used to upgrade a second vehicle-mounted device of the vehicle, wherein processing the first data segment to obtain the first check value comprises:
    setting, by the first vehicle-mounted device, the first data segment as a first input of the first algorithm to obtain first output data as the first check value when the first data segment is a first in a sequence of the data segments in the upgrade file; and
    when the first data segment is not the first in the sequence of the data segments in the upgrade file:
        processing, by the first vehicle-mounted device, a previous data segment of the first data segment according to the first algorithm to obtain a second check value; and
        setting, by the first vehicle-mounted device, the first data segment and the second check value as second inputs of the first algorithm to obtain second output data as the first check value;
encrypting, by the first vehicle-mounted device using a first key, the first data segment or both the first data segment and the first check value to obtain a first encrypted segment;
sending, by the first vehicle-mounted device to the second vehicle-mounted device, the first encrypted segment or both the first encrypted segment and the first check value;
receiving, by the second vehicle-mounted device from the first vehicle-mounted device, the first encrypted segment or both the first encrypted segment and the first check value;
decrypting, by the second vehicle-mounted device, the first encrypted segment using the first key to obtain the first data segment;
verifying, by the second vehicle-mounted device, the first check value according to the first algorithm;
storing, by the second vehicle-mounted device, the first data segment in a memory of the second vehicle-mounted device when the first check value is successfully verified; and
forming, by the second vehicle-mounted device and based on the first data segment, the upgrade file to upgrade the second vehicle-mounted device.

2. The method of claim 1, wherein before processing the first data segment, the method further comprises:
    performing, by the first vehicle-mounted device, a two-way authentication with a download server and according to a Hypertext Transfer Protocol (HTTP) over Secure Sockets Layer (SSL) (HTTPS);
    receiving, by the first vehicle-mounted device from the download server, an encrypted file that is based on the upgrade file; and
    decrypting, by the first vehicle-mounted device, the encrypted file when a preset upgrade condition is met to obtain the upgrade file.

3. The method of claim 1, further comprising:
    performing, by the first vehicle-mounted device, a two-way authentication negotiation with the second vehicle-mounted device and according to a Transport Layer Security (TLS) protocol; and
    processing, by the first vehicle-mounted device, the first data segment according to the TLS protocol and the first algorithm to obtain a message authentication code of the first data segment as the first check value.

4. A first vehicle-mounted device comprising:
    a processor configured to:
        process a first data segment according to a first algorithm to obtain a first check value, wherein the first data segment is in a plurality of data segments comprised in an upgrade file used to upgrade a second vehicle-mounted device, and wherein the processor is configured to process the first data segment at least in part by being configured to:
            set the first data segment as a first input of the first algorithm to obtain first output data as the first check value when the first data segment is a first in a sequence of the data segments in the upgrade file; and
            when the first data segment is not the first in the sequence of the data segments in the upgrade file:
                process a previous data segment of the first data segment according to the first algorithm to obtain a second check value; and
                set the first data segment and the second check value as second inputs of the first algorithm to obtain second output data as the first check value; and
        encrypt the first data segment or both the first data segment and the first check value using a first key to obtain a first encrypted segment; and
    a transceiver coupled to the processor and configured to:
        send the first encrypted segment or both the first encrypted segment and the first check value to the second vehicle-mounted device.

5. The first vehicle-mounted device of claim 4, wherein before processing the first data segment, the processor is further configured to perform a two-way authentication with a download server and according to a Hypertext Transfer Protocol (HTTP) over Secure Sockets Layer (SSL) (HTTPS) protocol, wherein the transceiver is further configured to receive, from the download server, an encrypted file that is based on the upgrade file, and wherein the processor is further configured to decrypt the encrypted file when a preset upgrade condition is met to obtain the upgrade file.

6. The first vehicle-mounted device of claim 4, wherein the processor is further configured to:
    perform a two-way authentication negotiation with the second vehicle-mounted device and according to a Transport Layer Security (TLS) protocol to obtain the first key; and
    process the first data segment according to the TLS protocol and the first algorithm to obtain a message authentication code of the first data segment as the first check value.

7. A second vehicle-mounted device comprising:
    a transceiver configured to:
        receive a first encrypted segment from a first vehicle-mounted device, wherein the first encrypted segment is based on a first data segment and a first key, and wherein the first data segment is in a plurality of data segments comprised in an upgrade file used to upgrade the second vehicle-mounted device; and
        receive a first check value from the first vehicle-mounted device, wherein the first check value is based on the first data segment and a first algorithm, and wherein the first check value is either:
            first output data of the first algorithm when the first data segment is a first in a sequence of the data segments in the upgrade file and when the first data segment is a first input of the first algorithm; or
            second output data of the first algorithm when the first data segment is other than the first in the sequence of the data segments in the upgrade file and when the first data segment and a second check value are second inputs of the first algorithm, wherein the second check value is based on a previous data segment of the first data segment and the first algorithm; and a processor coupled to the transceiver and configured to:
 decrypt the first encrypted segment using the first key to obtain the first data segment;
 verify the first check value according to the first algorithm;
 store the first data segment in the second vehicle-mounted device when the first check value is successfully verified; and
 form the upgrade file based on the first data segment to upgrade the second vehicle-mounted device.

8. The second vehicle-mounted device of claim 7, wherein the first data segment is the first in the sequence and the first data segment is the first input, and wherein the first check value is the first output data.

9. The second vehicle-mounted device of claim 7, wherein the first data segment is other than the first in the sequence and the first data segment and the second check value are the second inputs of the first algorithm, and wherein the first check value is the second output data.

10. The second vehicle-mounted device of claim 7, wherein the first check value is a message authentication code that is of the first data segment and that is based on the first data segment, a Transport Layer Security (TLS) protocol, and the first algorithm.

11. The second vehicle-mounted device of claim 7, wherein the first encrypted segment is further based on the first check value.

12. The second vehicle-mounted device of claim 7, wherein the processor is further configured to perform a two-way authentication negotiation with the first vehicle-mounted device and according to a Transport Layer Security (TLS) protocol, and wherein the first check value is a message authentication code that is of the first data segment and that is based on the first data segment, the TLS protocol, and the first algorithm.

13. A vehicle comprising:
 a first vehicle-mounted device configured to:
  process a first data segment according to a first algorithm to obtain a first check value, wherein the first data segment is in a plurality of data segments comprised in an upgrade file, and wherein the first vehicle-mounted device is configured to process the first data segment at least in part by being configured to:
   set the first data segment as a first input of the first algorithm to obtain first output data as the first check value when the first data segment is a first in a sequence of the data segments in the upgrade file; and
   when the first data segment is not the first in the sequence of the data segments in the upgrade file:
    process a previous data segment of the first data segment according to the first algorithm to obtain a second check value; and
    set the first data segment and the second check value as second inputs of the first algorithm to obtain second output data as the first check value;
  encrypt the first data segment or both the first data segment and the first check value using a first key to obtain a first encrypted segment; and
  send the first encrypted segment or both the first encrypted segment and the first check value; and
 a second vehicle-mounted device coupled to the first vehicle-mounted device and configured to:
  receive the first encrypted segment or both the first encrypted segment and the first check value from the first vehicle-mounted device;
  decrypt the first encrypted segment using the first key to obtain the first data segment;
  verify the first check value according to the first algorithm;
  store the first data segment in a memory of the second vehicle-mounted device when the first check value is successfully verified; and
  form, based on the first data segment, the upgrade file to upgrade the second vehicle-mounted device.

14. The vehicle of claim 13, wherein before processing the first data segment, the first vehicle-mounted device is further configured to:
 perform a two-way authentication with a download server and according to a Hypertext Transfer Protocol (HTTP) over Secure Sockets Layer (SSL) (HTTPS);
 receive, from the download server, an encrypted file that is based on the upgrade file; and
 decrypt the encrypted file when a preset upgrade condition is met to obtain the upgrade file.

15. The vehicle of claim 13, wherein the first vehicle-mounted device is further configured to:
 perform a two-way authentication negotiation with the second vehicle-mounted device and according to a Transport Layer Security (TLS) protocol to obtain the first key; and
 process the first data segment according to the TLS protocol and the first algorithm to obtain a message authentication code of the first data segment as the first check value.

16. The vehicle of claim 13, wherein the first vehicle-mounted device is a telematics box (Tbox), and wherein the second vehicle-mounted device is an electronic control unit (ECU) or a vehicle control unit (VCU).

* * * * *